(12) United States Patent
Jakobsson et al.

(10) Patent No.: US 7,502,933 B2
(45) Date of Patent: Mar. 10, 2009

(54) IDENTITY AUTHENTICATION SYSTEM AND METHOD

(75) Inventors: Markus Jakobsson, Hoboken, NJ (US); Ari Juels, Brookline, MA (US); Burton S. Kaliski, Jr., Wellesley, MA (US)

(73) Assignee: RSA Security Inc., Bedford, MA (US)

( * ) Notice: Subject to any disclaimer, the term of this patent is extended or adjusted under 35 U.S.C. 154(b) by 701 days.

(21) Appl. No.: 10/724,034

(22) Filed: Nov. 26, 2003

(65) Prior Publication Data

US 2004/0172535 A1 Sep. 2, 2004

Related U.S. Application Data

(60) Provisional application No. 60/429,754, filed on Nov. 27, 2002.

(51) Int. Cl.
*H04L 9/00* (2006.01)
(52) U.S. Cl. ............................ 713/172; 726/9
(58) Field of Classification Search ................ 713/168, 713/170; 173/170; 726/3
See application file for complete search history.

(56) References Cited

U.S. PATENT DOCUMENTS

| 5,177,789 | A | | 1/1993 | Covert | 380/23 |
|---|---|---|---|---|---|
| 5,251,259 | A | * | 10/1993 | Mosley | 713/184 |
| 5,768,382 | A | * | 6/1998 | Schneier et al. | 380/251 |
| 6,032,257 | A | * | 2/2000 | Olarig et al. | 726/35 |
| 6,091,835 | A | * | 7/2000 | Smithies et al. | 382/115 |
| 6,904,526 | B1 | * | 6/2005 | Hongwei | 713/182 |
| 6,928,558 | B1 | * | 8/2005 | Allahwerdi et al. | 726/9 |
| 7,024,698 | B2 | * | 4/2006 | Tanaka et al. | 726/26 |
| 7,305,701 | B2 | * | 12/2007 | Brezak et al. | 726/5 |
| 2006/0287955 | A1 | * | 12/2006 | Moulart et al. | 705/44 |

FOREIGN PATENT DOCUMENTS

| DE | 199 61 403 | 8/2001 |
|---|---|---|
| EP | 0 857 842 | 8/1998 |
| EP | 1 028 401 | 8/2000 |

OTHER PUBLICATIONS

"Authentication Reference Guide," Online! Apr. 9, 2002, Secure Computing, pp. 1-18.

* cited by examiner

*Primary Examiner*—Gilberto Barron, Jr.
*Assistant Examiner*—Samson B Lemma
(74) *Attorney, Agent, or Firm*—BainwoodHuang

(57) ABSTRACT

A method and system for generating an authentication code that depends at least in part on a dynamic value that changes over time, an event state associated with the occurrence of an event, and a secret associated with an authentication device. By generating the authentication code responsive to an event state, an identity authentication code can be used to verify identity and to communicate event state information, and to do so in a secure manner.

69 Claims, 8 Drawing Sheets

| | COLUMN 1 DEVICE SECRET | COLUMN 2 EVENT STATE DATA | COLUMN 3 ACTION | COLUMN 4 OUTPUT |
|---|---|---|---|---|
| $T_1$ | Initial - $A_1$ | Initial - $B_1$ | - | - |
| $T_2$ | $A_2$ | $B_2$ | TIME | - |
| $T_3$ | $A_2$ | $B_2$ | PIN ENTRY | ID AUTH CODE ($A_2$, $B_2$) |
| $T_4$ | $A_3$ | $B_3$ | TIME | - |
| $T_5$ | $A_3$ | $B_4$ | EVENT REGISTERED | - |
| $T_6$ | $A_4$ | $B_5$ | TIME | - |
| $T_7$ | $A_4$ | $B_5$ | PIN ENTRY | ID AUTH CODE ($A_4$, $B_5$) |

FIG.5

IDENTITY AUTHENTICATION SYSTEM AND METHOD

CROSS REFERENCE TO RELATED APPLICATIONS

This application claims the benefit under 35 U.S.C. § 119(e) of U.S. Provisional Application No. 60/429,754, filed Nov. 27, 2002.

FIELD OF THE INVENTION

The invention relates generally to the fields of cryptography and security. More specifically, the invention relates to the generation and verification of identity authentication codes.

BACKGROUND OF THE INVENTION

Generally, security systems employ identity-based authentication schemes to verify the identity of an entity that is allowed access to a physical location or object, in the case of a physical security system, or electronic access to a computer system or data, in the case of a data security system. One goal of such security systems is to accurately determine identity so that an unauthorized party cannot gain access. Security systems can use one or more of several factors, alone or in combination, to authenticate entities. For example, identification systems can be based on something that the entity knows, something the entity is, or something that the entity has.

Examples of something an entity knows are a code word, password, personal identification number ("PIN") and the like. One exemplary computer-based authentication method involves the communication of a secret that is specific to a particular entity or user. The entity seeking authentication transmits the secret or a value derived from the secret to a verifier, which authenticates the identity of the entity. In a typical implementation, an entity communicates both identifying information (e.g., a user name) and a secret (e.g., a password) to the verifier. The verifier typically possesses records that associate a secret with each entity. If the verifier receives the appropriate secret for the entity, the entity is successfully authenticated. If the verifier does receive the correct secret, the authentication fails.

Examples of something the entity is include characteristics that are unique to people, such as physical, biological, and psychological characteristics (referred to generally here as biological characteristics), such as fingerprints, handwriting, eye retina patterns, and face, body, and organ appearance, size and shape. Suitable biological characteristics typically are not under the control of the person, and are therefore difficult for anyone besides the intended person to present, because, in part, they are difficult to replicate. The verifier typically can observe the characteristic, and compare the characteristic to records that associate the characteristic with the entity. The observation of biological characteristics is referred to generally as biometric measurement.

An example of something an entity possesses is a physical or digital object, referred to generally as a token, that is unique, or relatively unique, to the user. A simple example is a conventional metal key for use in a door. Possession of the door key in effect authenticates the user to the lock and allows entry. Similarly, possession of a token such as a bank card having certain specific physical and electronic characteristics, for example containing a specific identification number that is revealed when the token is accessed in a particular manner, can be this type of factor. A token containing a computing device that performs encryption using an encryption key contained in the device would also be regarded as this type of factor. For example, a token could accept user input, which might include a PIN or a challenge value, and provide as output a result encrypted with a secret encryption key stored in the card. The verifier can then compare the output to an expected value in order to authenticate the entity.

A token might also, or alternatively, use additional input information, such as time, or a counter, for example, such that the result changes over time but is deterministic to an entity that possesses a secret (e.g., a value known only by the token and the verifier), but not predictable by an observer who does not possess the secret. These systems generally perform some computation using a stored secret as input to generate an authentication code that is used to authenticate the entity. Some systems are time-based, in that they use a time-based dynamic variable to calculate a non-predictable authentication code that ultimately authenticates the entity. Here, "non-predictable" means that the authentication code is not predictable by a party that does not know the associated secret, the algorithm for calculating the code, or both. One example, U.S. Pat. No. 5,937,068 entitled "System and Method for User Authentication Employing Dynamic Encryption Variables," uses as input a combination or subset of three variables: the current time, the number of access requests made by the card, and a "secret dynamic encryption key" that is updated with each access request. The token, in this case, also verifies a PIN entered by the user before communicating an authentication code.

Although the dynamic nature of the authentication codes generated by such an approach avoids problems inherent with using fixed authentication codes, an unattended or stolen token remains vulnerable to attack. Would-be attackers who gain access to tokens can subject the tokens to sophisticated analysis intended to determine their methods of operation, and/or the secret(s) stored within. Attackers might inspect the token and conduct such analysis in order to determine the associated secret, the algorithm for calculating the authentication code, or both. The attacker might then be able to generate apparently valid authentication codes in order to illegally gain physical or electronic access to secured areas or systems. Many tamper-resistant hardware designs are available, however, new attacks are frequently developed to thwart tamper resistance. Further, current tamper resistant designs do not provide verifiers, authentication systems, system administrators, or another relevant authority with any indication that the token has been tampered with.

One approach to detection of tampering is described in Johan Håstad, Jakob Jonsson, Ari Juels, Moti Yung, "funkspiel schemes: an alternative to conventional tamper resistance", ACM Conference on Computer and Communications Security 2000; 125-133. Håstad et al. describe several "funkspiel schemes" whereby a device can indicate to a verifier that tampering has occurred, without revealing to an adversary whether the tampering has been detected. The schemes are oriented toward the generation of a sequence of message authentication codes, where the message authentication may fail after tampering has been detected. In one example given, the message authentication code is embedded into a digital signature scheme, where the digital signature indicates whether a transaction has been approved by a device, while the message authentication code indicates whether the device has been tampered with. The message authentication code itself may not be suitable as an identity authentication code as it is oriented toward a sequence of message transactions rather than time-based identity authentication. In particular, Håstad et al does not provide any method for efficiently verifying a single authentication code among those over a very long period of time, without substantial computation by the verifier (e.g., a potentially long chain of function evaluations), substantial computation by both parties (e.g., asymmetric encryption) or substantial storage by both parties (e.g., many one-time bits).

SUMMARY OF THE INVENTION

The invention addresses these shortcomings by including an indication of the occurrence of an event directly into the efficient computation of an identity authentication code, where the verifier may efficiently verify the authentication code and identify the signaling of an event state.

While the previous approaches do not have the flexibility to communicate event information in, or as part of, an authentication code, in the present approach, an authentication code is generated in a manner that communicates to the verifier information about the occurrence of one or more reportable events. A reportable event is an event other than events associated with the normal operation of an authentication method (and that can be reported to the verifier). Thus, for example, a reportable event would not include an event reporting a request for an authentication code. A reportable event could be, on the other hand, an event that is at least one of an anomalous, extraordinary, remarkable, unusual, and the like. A reportable event also could be any sort of event that can be detected and/or communicated by or to the device. Example reportable events include: device tampering; an event external to the device detected by the device; an environmental event, such as temperature exceeding or falling below a threshold; static discharge; high or low battery power; geographic presence at a particular location; confidence level in a biometric reading; and so on. A reportable event may also provide an indication of the likelihood that the security of the authentication system has been compromised or the likelihood that the authentication device has or will develop an operational problem (e.g., the condition of the authentication device). A reportable event can be the cumulative effect of multiple past events. A reportable event also can be the device operational status.

A reportable event may include information concerning the condition of the authentication device (e.g., tampering, low battery power, etc.), the security of the authentication system (e.g., strength of a user's biometric information, accuracy of a PIN entry, verification of an authentication device signature), the status of the user (e.g., mobile or stationary, network access location, location in a facility, etc.), the location of the device (e.g., region, country, city, etc.) or the environment where the device is located (e.g., temperature, radiation level, etc.). In one embodiment, the reportable event directly reports information concerning at least one of the condition of the authentication device, the security of the authentication system, the status of the user, the location of the authentication device, and the environment where the authentication device is located.

In general, in certain aspects of the invention, a user or a device on behalf of the user, algorithmically computes an authentication code based on both a dynamic variable (e.g., that changes over time) and a secret associated with the user or the device. The generated authentication code is non-predictable to an observer, but is verifiable by a verifier. The authentication code can also depend, in part, on any other information, for example, on one or more of a PIN, a password, and data derived from a biometric observation, or information associated with the user, the authentication device, or the verifier.

The security of an authentication system is improved when a device takes specific action upon the occurrence of a reportable event. In one illustrative example, if an attacker attempts to disassemble or otherwise tamper with a device, it is useful for the device to signal the occurrence of such event (once detected by the device) to a verifier by communicating the device's event state. In this example, the tampering event has at least two possible event states; yes—tampering occurred, and no—tampering has not occurred. Other information also can be communicated, such as information about the type of tampering or information about the time that the tampering occurred. Other examples of reportable events include environmental events (e.g., high or low temperature), battery voltage level, and accuracy of PIN or password entry.

In one embodiment, the occurrence of an event is communicated explicitly in the authentication code. For example, one or more bits included in the authentication code can be dedicated to reporting the occurrence of an event, i.e., reporting the event state (and herein we refer to event state data as data representing, communicating, or derived from the event state) where the event state is information about the state of a device with respect to the occurrence or non-occurrence of event(s). In another embodiment, the device's event state can be communicated implicitly, such that only the device and the verifier can feasibly determine the event state from the communication. It may be advantageous if an attacker with access to device is unable to determine if an event was detected and communicated because an unwarned attacker is more likely to take actions that can lead to observation and apprehension by authorities. In some embodiments, the device operates differently upon occurrence of an event, such that the occurrence of the event is communicated in identity authentication codes output by the device subsequent to the occurrence of the reportable event. This may help discourage copying. For example, when a device that is providing an alert of an anomalous event is copied, the "clone," or copied device will also report the anomalous event.

In one embodiment, authentication methods can be incorporated in a hardware device provided to the user, such as a token or a key fob. (Other possibilities are described below.) Additionally, a device can include a software program for carrying out the method, for example, as software executing on a general-purpose computer, handheld computer, telephone, personal digital assistant, and so on, or in some other manner. The device may, in some implementations, allow the user to input a second secret, such as a PIN, verifier identifier, and so on, in order to generate an authentication code.

In general, in one aspect, the invention relates to an authentication device that generates an identity authentication code by storing an event state in the device, modifying the event state in response to an event, and generating an authentication code that depends, at least in part, on a dynamic value (e.g. a time value), the event state, and a secret associated with the device. The authentication device thus produces a different identity authentication code based on the event state. By comparing a received authentication code to the possible authentication codes that could be generated by the authentication device, the verifier can not only verify the identity of the user, but can also determine the event state, and thereby determine whether one or more events occurred.

In some embodiments, the event state is associated with one or more reportable events. In some embodiments, the event state is modified in response to a reportable event. In some such embodiments, the event state is stored in the form of event state data, which reflects the state of one or more reportable events. The event state data thus can communicate the event state.

In some embodiments, the method is constructed such that it is not possible for an attacker who has access to the device to determine whether the report of an event was communicated in the authentication code. As briefly described above, the communication of the event information can be referred to as "covert." On the other hand, if some event information can be deduced by an attacker or observer, then the communication is referred to as "overt." Covert communication may be beneficial because it can be used to report the occurrence of an event without an attacker becoming aware of the report. Overt communication may be beneficial in that it allows a general observer to become informed about state information. It is possible to signal some part of an event state in a covert manner, and another part in an overt manner.

An implementation of a system for generating an identity authentication code using event state information can include a data store for storing an event state in an authentication device, an event recorder for modifying the event state in response to one or more reportable events, and an authentication code generator for generating an identity authentication code that depends at least in part on a dynamic value, the event state, and a secret associated with the device. Such an implementation can be included as either part of an authentication device (e.g., a token) or part of a verifier (e.g., a verification computer), or both. For both the device and the verifier, the system can be implemented as software running on a computer, such as a microprocessor or other general purpose computer. The system can also be implemented in hardware, as described above.

In general, in another aspect, the verifier receives authentication information that includes an identity authentication code generated by a device that at least in part depends on time, a secret associated with the device, and an event state. The verifier verifies the identity of the user and determines the event state in response to the received identity authentication code. The verifier can determine whether an event occurred from the event state. The verifier can take action in response to the determined event state, for example, logging the event state for later analysis, warning the system administrator or relevant authorities, or providing more limited access to the location or system than would be granted if a different event state was determined. The authentication information can also include one or more of a user identifier, a PIN, password, a biometric reading, and other additional authentication information.

In some embodiments, the verifier generates an expected identity authentication code that depends at least in part on a dynamic value associated with a time period and the event state. The event state can include an event state secret, described further below, and bits derived from the event state secret, where one or more bits are associated with a time interval.

In general, in another aspect, the invention relates to a system and method for generating an identity authentication code by, for example, an authentication device and/or a verifier. Describing first the device, the device stores a first secret value associated with the authentication device, and a second secret value associated with event state. The device also generates a dynamic value that changes over time. The device derives from the second value and the dynamic value event state data associated with a time period. The device derives a value for a time period from the first value and the event state data. The device then calculates an identity authentication code using the time-specific value as input. The verifier likewise can implement these method steps so as to determine one or more possible authentication codes, depending on the event state data.

In one embodiment, the event state data includes bits each associated with a time period, where the time-specific value is derived from the first value and the respective bit associated with the time period. In such an embodiment, there are two possible states associated with a time period, depending on the value of the bit. If an event occurs, the bits are modified in response to the detected event, such that the generated authentication code is the other of the two possible choices. Optionally, the second secret value (associated with the event state) can also be modified in response to the detected event, such that later generations of event state bits will have a different value than normal. The first secret value can be the same as the second secret value, or they can be different values, or they can partially overlap.

In one embodiment, the event state data comprises a number of bits associated with a respective time period, wherein the time-specific value is derived from the first value and the number of bits associated with the respective time period.

In general, in another aspect, a system for generating an identity authentication code associated with an authentication device includes an authentication code generator. The authentication code generator generates an identity authentication code that depends at least in part on a dynamic value that changes over time, an event state indicative of the occurrence of an event, and a secret associated with the authentication device. One embodiment of such a system is implemented as a software program for execution on a processor, such as a microprocessor or general purpose computer. The system can be included in an authentication device or a verifier, or in another system.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5 is an example demonstrating the use of event state data in generating an authentication code.

DETAILED DESCRIPTION

Figure 1:
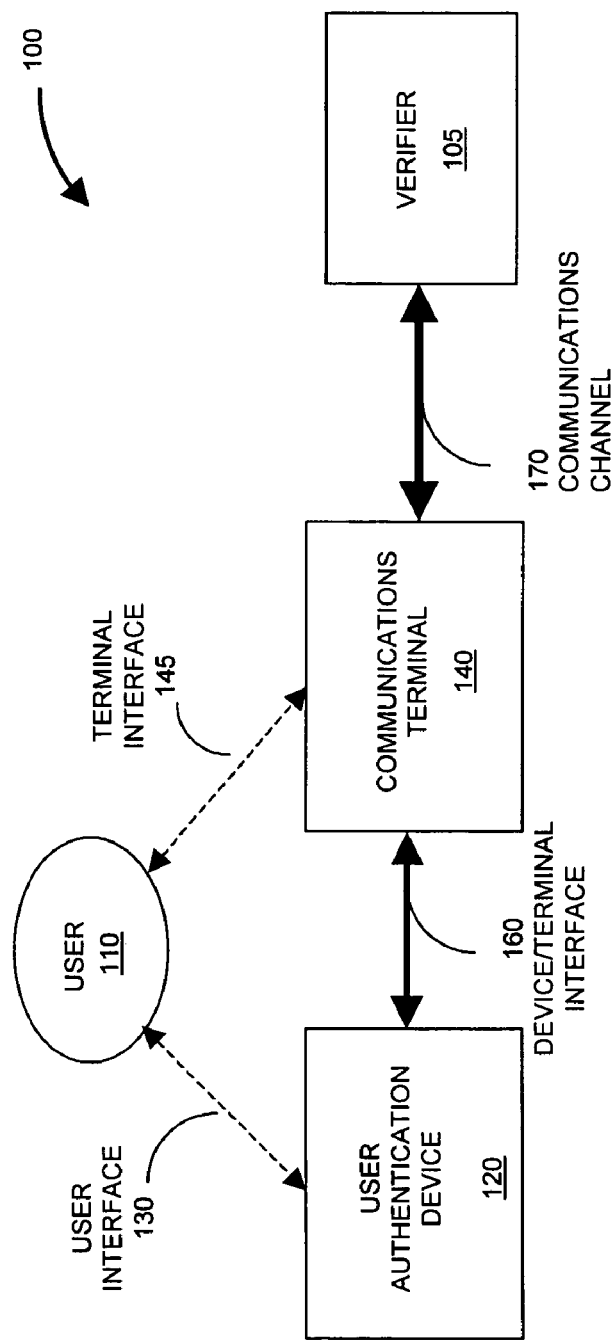
FIG. 1 is a block diagram depicting an authentication system including an authentication device and a verifier according to an embodiment of the invention.

Referring to FIG. 1, in one embodiment of an authentication system 100 according to the invention, a verifier 105, is used to help securely authenticate the identity of exemplary user 110. As used here, "authenticate" means to verify the identity of a user, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of a single user 110 is exemplary, and typically a verifier 105 will be used to verify a large number of users 110. Similarly, the inclusion of a single verifier 105 is exemplary, and typically a user 110 can have an authentication attempt verified by one or more of a large number of verifiers 105. In some embodiments, a single verifier 105 is able to verify a user 110, while in other embodiments, two or more verifiers 105 are together required to perform this task.

The verifier 105 can be any sort of device that implements the functions described here. In one embodiment, the verifier 105 is implemented as software running on a server class computer including a processor, memory, and so on, to enable authentication of a large number of users, for example, in an enterprise. The verifier 105 can also be implemented as software running on a desktop computer, laptop computer, special-purpose device, or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC) and the like. In still further embodiments, the verifier 105 can be implemented in a cellular telephone, or specialized hardware embedded in a cellular telephone and adapted to interact with the cellular telephone's circuitry. Other sizes, shapes, and implementations are possible without departing from the spirit of the invention.

Authentication can result in the performance of one or more actions including, without limitation, providing access or privileges, taking action, or enabling some combination of the two. Access includes, without limitation: access to a physical location, communications network, computer system, and so on; access to such services as financial services and records, health services and records and so on; or access to levels of information or services. The user 110 and the verifier 105 can be physically near one another or far apart.

As illustrated, a user 110 can communicate with a user authentication device 120. The user authentication device 120 provides information used to authenticate the user 110. The user authentication device 120 can optionally provide a user interface 130. Communication between the user 110 and the user authentication device 120 can take place via this user interface 130. The user interface 130 can provide an input interface, an output interface, or both. An input interface enables the user 110 to communicate information to the user authentication device 120. The input interface can be any mechanism for receiving user input, and can include, without limitation: a keypad or keyboard; one or more push buttons, switches or knobs; a touch sensitive screen; a pointing or pressing device; a trackball; a device for capturing sound, voice or handwriting; a device for capturing biometric input (such as a fingerprint, retina or voice characteristic); and so forth. An output interface enables the user authentication device 120 to communicate information to the user 110 and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface; and so forth. In some embodiments, the user 110 provides, via the user interface 130, identifying information (such as a user identifier, PIN, or password, or a biometric characteristic such as a fingerprint, retina pattern, or voice sample), or possessions (such as physical keys, digital encryption keys, digital certificates, or authentication tokens) to the user authentication device 120.

The user authentication device 120 can take various forms in various embodiments of the invention, provided that the user authentication device 120 performs the functions required of the user authentication device 120 for secure authentication. The user authentication device 120 can be implemented in packages having a wide variety of shapes and form factors. For example, the user authentication device 120 can be a credit-card sized and shaped device, or can be much smaller or much larger. One credit-card sized embodiment of the user authentication device 120 includes a microprocessor with on-board memory, a power source, and a small LCD display. The embodiment optionally includes a keypad or buttons for PIN entry, entry of authentication information requests, or for other entry or interaction with the device 120. In another embodiment, a credit-card sized device 120 includes a processor with on-board memory that is used as a "smart card," that can be installed into another device that provides power and/or interface. In still other embodiments, a credit-card sized device 120 is a card such as a credit card including a magnetic strip or other data store on one of its sides. In other embodiments, the user authentication device 120 is a "key fob," that is, a smaller device with a display and battery that is sized and shaped to fit on a key ring. In yet another embodiment, the user authentication device 120 is a peripheral device that communicates with a computer, telephone, or other device, such as a USB dongle. In still other embodiments, the user authentication device 120 can be a desktop computer, laptop computer, or personal digital assistant (PDA). For example, the authentication device 120 can be implemented as a software program running on a general-purpose computer, possibly interacting with one or more other computer programs on the same or a different computer. In still further embodiments the user authentication device can be a cellular telephone, or specialized hardware embedded in a cellular telephone and adapted to interact with the cellular telephone's circuitry, such as a SIM card. In this example and in others, the authentication device 120 can include two components in communication with each other, for example a wireless communications device (e.g., mobile telephone) and a removable accessory, such as a SIM card. Other sizes, shapes, and implementations are possible without departing from the spirit of the invention.

Exemplary authentication devices with which the embodiments of the invention can be used are members of the RSA SECURID family of authentication tokens, available from RSA Security Inc. of Bedford, Mass. Some RSA SECURID hardware devices, for example, display a generated authentication code to a user, who then communicates the displayed authentication code to a computer for communication to a verifier. For example, in one embodiment, the information is a numerical value.

In some embodiments, the user authentication device 120 stores a secret that is used to authenticate the user 110. Typically, the stored secret is information that only is available to the authentication device and the verifier. For example, in one embodiment, the information is a numerical value. The stored secret is used to generate an authentication code for the user 110. The user authentication device 120 also can store or access dynamic data, which, for example, can be the current time, if implemented with a running clock. The user authentication device 120 can also provide other information, or perform other calculations or combination functions, as described further below. For example, in one embodiment, in addition to storing a secret the device 120 receives a personally selected secret from the user 110 (such as a PIN or password) and generates a dynamic, non-predictable authentication code in response to the secret received from the user 110, the stored secret, and the current time. Here, for example, a non-predictable authentication code is not predictable to anyone who does not have access to the secret received from the user 110, the stored secret, and the algorithm that generates the authentication code. The user authentication device 120 optionally can also receive other input, such as a verifier identification, and use that and/or other additional information in the generation of the authentication code.

The exemplary user 110 optionally (and depending on implementation) has one or both of direct access to the communications terminal 140, and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a network interface card; a wireless transceiver; and so on. During the authentication process the user 110 can directly communicate information to only the device 120, only the terminal 140, neither the device 120 nor the terminal 140, or both the device 120 and the terminal 140. Likewise, the communications terminal 140 can receive direct input from the user 110, the user authentication device 120, or both. As shown, the user 110 optionally communicates directly with the communications terminal via the terminal user interface 145 that can be present depending on the implementation of the communications terminal 140. Like the device user interface 130, the terminal user interface 145 can include an input interface, an output interface, or both. The input and the output interfaces can take one or more of the forms described above for the device user interface 130, or other forms.

The communications terminal 130 can optionally provide a device/terminal interface 160 for communications between the terminal 140 and the user authentication device 120. In one embodiment, this interface can take the form of a wired or wireless communications channel between the terminal 140 and the device 120, using standard or proprietary protocols. For example, in an embodiment in which the device 120 is a smart card and the terminal 140 includes a card reader, the communications interface 160 could be a wired serial communications link between the smart card and the reader. In another embodiment in which the device 120 is a token that has wireless communications capability and the terminal 140 includes a wireless transceiver, the interface 160 could be a wireless link.

The communications terminal 140 can provide a user interface 130, via a terminal interface 145, without providing a device interface 160 for the device 120. For example, the terminal 140 can be a telephone that the user 110 uses to communicate authentication information to the verifier 105. In such an embodiment the user authentication information can be represented as tones associated with a series of alphanumeric digits. In this embodiment the user 110 dials a telephone number to establish a communications connection with the verifier 105 and performs a series of key presses on the telephone to communicate the alphanumeric user authentication information to the verifier 105.

The terminal 140 and the authentication device 120 can each be integrated, together or separately, into another device, likewise, the functionality of the terminal 140, the device 120; and their respective interfaces 130, 145, 160 can be implemented in separable components. For example, the authentication device 120 can be implemented as an add-in card to a handheld computer (not shown). The handheld computer provides the user interface 130, and also provides the terminal 140 in the form of a wireless network interface. Likewise, a mobile telephone can provide terminal 140 and user interface 130 functions, while the mobile telephone, or a plug-in component such as a SIM card, provides some or all the authentication device 120 function.

The communications terminal 140 communicates information to the verifier 105 via a communications channel 170. The communications channel 170 can be any method and/or interface that enables communication of information to the verifier 105 that is required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 processes the information received from the communications terminal 140. The verifier 105 can perform actions in response to authenticating the identity of the user 110. For example, the verifier 105 can grant on-line access to data or physical access to restricted areas or physical items.

The authentication code communicated over the communications channel 170 is designed to be dynamic and unpredictable (to an observer without knowledge of the algorithm and/or the secret used to generate the authentication code and/or access to previous user authentication attempts) for each user authentication attempt. In some embodiments, the algorithm is selected such that the authentication code is non-predictable even if the algorithm is known to the attacker. Also, the algorithm may be selected such that knowledge of a large set of previous authentication attempts for a multiplicity of users would not make an authentication code predictable to an attacker. The authentication code can also communicate event state information, as described further below.

For each user authentication attempt, the verifier 105 receives user authentication information and verifies the received information. As described further below, in some embodiments, the verifier also determines an event state indicating whether one or more events has occurred, and optionally, in some cases, the nature of an event. In some embodiments, in order to authenticate the user, the verifier 105 performs algorithmic calculations for each user authentication attempt that is substantially identical to the algorithmic calculation performed by the user authentication device 120. In some embodiments, the verifier can determine authentication codes for a number of possible events and event states such that a number of authentication codes that can successfully authenticate the user 110 are possible. The verifier 105 compares the authentication information received over communications channel 170 and the authentication information generated by the verifier 105 to determine whether any match. If there is a match, then the verifier 105 can authenticate the identity of the user 110 depending on the event state determined. In one embodiment, when the received and generated user information do not match, the user authentication attempt fails. In some embodiments, the verifier can communicate positive or negative acknowledgement to the communications terminal 140 via the communications channel 170, and the terminal 140 may or may not communicate the acknowledgement to the device 120 or directly to the user 110. In further embodiments, where a plurality of authentication codes that can successfully verify the user 110 are possible, the verifier 105 first determines an expected authentication code for an expected event state, and if the verifier receives a different authentication code, determines and compares authentication codes for other possible event states before indicating whether the authentication device has been successfully verified. Note that there can be other possible authentication codes as well, for example due to a generation value increment (described further below) and imprecisely synchronized time clocks between the verifier 105 and the authentication device 120.

In one embodiment, a determination by a verifier of event occurrence triggers a restriction on the activities of a user 110, rather than a complete denial of access. The restriction can be based on the type of events that have occurred since the preceding authentication attempt. For example, a workstation user's access to highly confidential information can be eliminated while access to non-confidential information continues to be permitted when the user's PIN was entered into the authentication token incorrectly more than a specified number of times.

The user authentication device 120 can maintain event state data which indicates whether an event has occurred. The reportable event(s) about which the event state is maintained may be unusual events that do not occur during normal operation of the device. Examples of such anomalous events include tampering with the device, an environmental event (e.g. aberrant temperature), incorrect power supply, radiation detection, and so on. Other examples of reportable events can include, without limitation, device location (e.g., is the device in a specific building, room, city, country, region, or some combination); the length of time a device (e.g., if a card, token, etc.) is inserted in a reader (possibly indicating that a user left an unattended device in the reader); authentication quality (e.g., a number of PIN errors prior to successful authentication, strength of a biometric match, etc.); device signature or pattern (e.g., the device generates a pattern or sequence of bits that can be checked by the verifier, and the event state indicates the current bit in this pattern); related authentication (e.g., the verifier can determine whether access to network resources is being requested from a physical location that the requestor entered in an authorized manner); and location of the stored secret, (e.g., event state indicates whether a stored secret is in an approved hardware device (e.g., a card, token, etc.) or has been transferred (e.g., downloaded to a software container such as a laptop)). The size of the event state data can depend on the number of possible event states. For example, for two event states, only one bit is needed. For seven states, three bits, and so on. Thus, taking geographic location as an example, three bits can be used to indicate one of seven possible locations, or a much larger number of bits can be used to indicate longitude/latitude.

An event occurrence results in a change in the event state kept by the user authentication device 120, with the further result that the authentication code generated by the user authentication device 120, with high probability, will be different than otherwise expected by the verifier 105. The verifier 105 can determine whether a received identity authentication code is associated with one or more events, and if it is, take appropriate action, such as a warning to an administrator, restricted access, and so on.

The event state need not have a specific meaning to the verifier. For efficiency, the verifier can determine which event state(s) are most likely and initially check authentications with the authentication codes associated with the most likely event state(s). The verifier can verify authentication codes with the most likely event state information to determine whether the event state that is being signaled is either valid (e.g., expected) or invalid (e.g., unexpected). Additionally, the interpretation of the event state can be accomplished outside of the verification process. In one embodiment, the event state information is analyzed and interpreted by an entity who is not a verifier in order to determine what event the event state is signaling, e.g., tampering, low battery, etc. The verifier can communicate the event state information to a service that can interpret the event state.

When the verifier checks authentication codes for their correspondence with likely individual event states, the efficiency of the verifier's operation may depend on the number of likely event states. For example, if there are only two likely event states, then the verifier may only perform, at most, two checking operations, whereas if there are ten likely event states, the verifier may perform as many as ten checking operations. The verifier may be able to accommodate a significant number of event states in this manner. However, in some embodiments, the verifier can accommodate an increased number of event states because the authentication code may provide a hint to the verifier about the event state. In other embodiments, the event state may be provided in a way that can otherwise be recovered from the authentication code without checking all likely individual event states. In such embodiments, the efficiency of the verifier's operation may not depend on the number of such event states.

Since each likely event state may correspond to a different authentication code, the probability that a random authentication code is accepted by the verifier may increase as the number of likely event states increases, particularly if the length of the authentication code is fixed. Accordingly, it may be prudent to increase the length of an authentication code as the number of likely event states increases in order to keep the probability that a random authentication code is accepted sufficiently small. For example, if there are ten likely event states, then the length of the authentication code may be increased by one numeric digit.

As a simple example that does not have as many security benefits as the embodiments described later, in one embodiment, the user authentication device 120 maintains an event state data store. In this example, prior to the occurrence of an event, the event state data store equals zero. The contents of the event data store are combined with (e.g., added to) a first authentication code produced by the device 120 to form a second authentication code that is communicated to the verifier. Initially, the event state does not result in any change to the authentication code. Upon the occurrence of a specific event, the event state data store is modified to be one hundred. Specifically, in one embodiment, the authentication device 120 includes a switch activated by the opening of the case of the authentication device 120, such that if the device 120 is opened, the switch causes an interrupt, which causes the processor in the authentication device 120 to change the contents of the event data store to one hundred. When the second authentication code is the result of adding the contents of the event data store to the first authentication code, authentication codes generated thereafter will differ from the expected authentication code by exactly one hundred. The verifier will immediately recognize that a received authentication code (i.e., the second authentication code) is not the initially expected authentication code. The verifier will also recognize that the received authentication code is different than expected by a value of one hundred. The verifier will then conclude that the event that triggers the change in event state data (in this case, opening of the authentication device) has occurred. In further embodiments, different events may change the authentication code differently (e.g., add one, ten, etc.). In these embodiments, different events may be recognized depending on the resulting authentication code. As described further below, certain techniques can make it easier for the verifier to determine if an event occurred, while being much harder for an attacker to determine that an event occurrence was detected. The switch can be any means that provides a state change if the authentication device 120 is opened or otherwise tampered with including, without limitation, a separable contact surface, or any form of limit switch such as a pushbutton switch, rocker switch and the like.

In one embodiment, in order to authenticate the user 110 and determine the event state of the authentication device 120, the verifier 105 performs an algorithmic calculation on a received authentication code that "reverses" some or all of an algorithmic calculation performed by the user authentication device 120. In a simplistic example, the user authentication device 120 generates an authentication code by arithmetically combining a secret stored by the user authentication device 120 and a user-supplied PIN. In order to verify the user in this example, the verifier retrieves from its records the PIN associated with the user and the secret stored on the user's authentication device 120. The verifier 105 reverses the combination operation, e.g., by subtracting and/or XOR the user's PIN from the received authentication code. The verifier 105 compares the result after PIN removal to the value of the secret stored on the user's authentication device 120, or to the value that should have been generated at that time by the device 120 using the stored secret. If they match, the user is authenticated. If they do not match, user authentication fails. In some embodiments the verifier 105 decrypts a value encrypted by the user authentication device 120 using symmetric key encryption or asymmetric encryption techniques, such as public key encryption. In some embodiments, the verifier 105 also calculates the authentication code with an input that indicates whether one or more events have occurred. In other versions, the verifier 105 calculates the authentication code with an input that indicates whether an event has occurred, and also indicates additional information concerning the event.

In other embodiments, a first authentication of user 110 is performed by the user authentication device 120 based on information supplied to the authentication device 120 by the user 110. For example, the information supplied by the user may be a PIN, a password or biometric information. The device 120 may perform this first authentication alone or in combination with another device. If the first authentication is successfully verified by the authentication device 120, the device 120 generates an identity authentication code which is verified by the verifier 105. In one embodiment, the strength of the first authentication is communicated as event state in the authentication code that is verified by the verifier 105. For example, the event state can reflect the degree of the match of a biometric element. In a further embodiment, the first authentication is a local authentication performed in the presence of the user 110.

Figure 2:
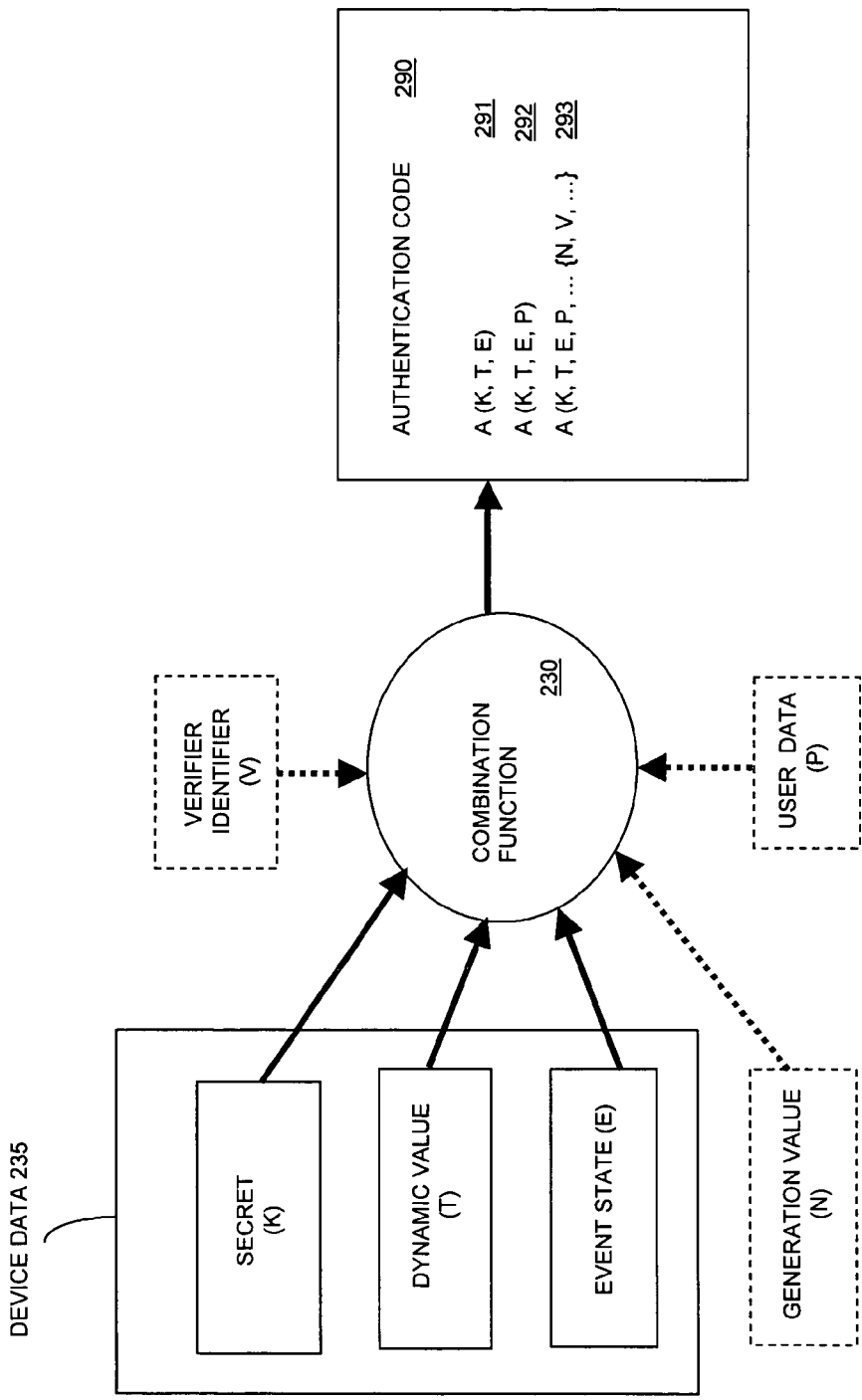
FIG. 2 is a block diagram depicting the generation of an authentication code according to an embodiment of the invention.

Referring to FIG. 2, in one embodiment of the user authentication device 120 and verifier 105 of FIG. 1, various values are combined by a combination function 230 to generate an authentication code 290. In general, the combination function 230 generates an authentication code 290 based on the data 235 stored or accessed by the user authentication device 120. As shown, such device data 235 includes a device secret (K) associated with the user authentication device 120, a dynamic, time-varying value (T) generated by the user authentication device 120, and an event state (E) representing the occurrence of one or more events.

Other examples of device data 235 include the time and date of manufacture of the user authentication device 120, the amount of time since generation of the last authentication code, an encoding of the location (e.g., latitude and longitude) of manufacture of the user authentication device 120, an encoding of the location (specifically or generally) of the user authentication device 120 at the time of generation of the authentication code (using GPS or enhanced GPS, for example), device signature or pattern, device type (e.g., hardware or software), or any combination of one or more of these or other quantities. The combination function 230 can also optionally employ one or more of user data (shown in phantom view as user data (P)) or verifier data (shown in phantom view as verifier identifier (V)) and a generation value (shown in phantom view as generation value (N) and described further below) to generate an authentication code (A) 290 for the user. Other examples of user data include data derived from biometric information such as retinal scans and fingerprints; identifying information such as social security number, birth date (possibly including time of birth); and unique names and numbers, or other information. Verifier data can include information identifying the verifier 105, such as a name, number, IP address, or processor serial number. A generation value N can indicate the number of authentication codes requested in a specified time period.

The combination function 230 can be implemented as instructions executed by a computer, for example, by firmware running on an embedded microprocessor. In other embodiments, the combination function 230 can be implemented in special-purpose hardware, such as an application specific integrated circuit, a field-programmable gate array, or other logic device. In still other embodiments, the combination function 230 can be implemented as a software application program running on a general-purpose desktop, laptop, or handheld, or other computing device.

The figure depicts generally a number of exemplary embodiments for generating an authentication code 290. It should be understood that the manner of combination and the input provided to the combination function 230 could vary from these examples. In one embodiment, an authentication code 291 is constructed from a stored secret (K), a dynamic value (T), and an event The combination function 230, and the elements of the combination function can be implemented in the device 120, the communications terminal 140, or a combination of the two.

The stored secret (K) is a unit of information such as a numerical value that is uniquely associated with the device 120. In a typical hardware implementation of the device 120, the secret (K) is manufactured into and stored inside the device 120 such that it is very difficult to extract the secret (K) from the device. In a typical software implementation of the device 120, the secret (K) is stored in a data store, preferably secure, and accessible to the device 120. In addition to being accessible to the device 120, the secret (K) is also stored in a secure data store accessible to the verifier 105. In some embodiments, only the device 120 has access to the secret (K), and the verifier has access to a function of the secret (K), or vice-versa. In some embodiments the device's 120 secret (K) corresponds to, but is not the same as a value stored with the verifier 105, for example, where each has one of a pair of keys in a public key cryptosystem. In other embodiments the secret (K) can be derived from a master secret ($K_{MASTER}$), as described below. In some embodiments, the secret (K) is a value that is chosen from a large number of possible values such that it would be difficult for an attacker who had access to the output of the combination function 230 to guess the secret by trying each possible secret value to see if it resulted in the observed authentication code. In one particular embodiment, the secret (K) is selected from the group of numbers that are 128 bits in length, (i.e., the set of nonnegative numbers less than or equal to $2^{128}-1$).

The dynamic value (T) is a unit of information such as a hexadecimal or decimal numerical value that changes over time. In one embodiment, the dynamic value (T) is uniquely associated with a particular pre-determined time interval demarcated by a particular starting time and ending time. The time interval is not required to be of any particular length nor is every time interval required to be the same length. The only requirement is that the time interval schedule be roughly synchronized between the device 120 and the verifier 105. Exemplary methods that can be used to synchronize the device 120 and the verifier 105 are described in U.S. Pat. No. 4,885,778, titled "Method and Apparatus for Synchronizing Generation of Separate, Free Running, Time Dependent Equipment." A time interval could have the length of a second, a minute, an hour, a month, a year, or any other convenient length of time. There is a balance to be struck between increased security from a shorter time interval and the processing capabilities of the device 120 and verifier 105, as well as the time that it will take for the authentication device 120 to provide the code to a verifier. For example, if the device 120 displays the authentication code for the user to type into the communications terminal, a time interval of a minute may be used. In one embodiment, the dynamic value (T), identifying a particular time interval, remains constant for all authentication codes generated within that particular time interval.

For example, in one embodiment, a constant time interval of a minute is used, and the dynamic value is the number of minutes since midnight, Jan. 1, 1980. In another embodiment, a time interval of an hour is used and the dynamic value is the number of seconds since Noon, Dec. 15, 1999. The number of seconds is determined for the first second of each time interval. In such an embodiment, the time from which counting begins can be a secret that is shared between the device 120 and verifier 105. The interval period length(s) can also be secrets that are shared between the device 120 and the verifier 105.

In another embodiment, the length of each time interval is an hour. Since, there are 24 hours in a day, each hour can be identified by a unique value such as the values 1 through 24; each of the 365 days of the year can be uniquely identified by the values 1 through 365; and each year can be identified by the number of the year, for example 2001. These three values, each identifying an hour, a day or a year, are combined in such a manner to produce a value that uniquely identifies one and only one particular one-hour time interval. This one hour time interval can be indicated by a particular (hour-day-year) combination. For example, the value 100232001 would uniquely identify the period of time between 9:00 am and 10:00 am on the $23^{rd}$ day (023) of the year 2001 (2001), that is Jan. 23, 2001. Similarly, the value 170322001 would uniquely identify the time period between 4:00 pm and 5:00 pm on the 32nd day (032) of the year 2001 (2001), that is Feb. 1, 2001. Other variations will be immediately understood by those of ordinary skill in the art.

In one embodiment, the dynamic value (T) is provided as the output of a time clock function, which output is in turn provided to a dynamic value function. The dynamic value function determines the appropriate dynamic value (T) in response to the data provided by the clock function. In one such embodiment, implemented in a device having a clock and a processor, the dynamic value (T) is generated by a clock that is a counter that is set to an initial value and is incremented every second. This clock counts the number of seconds since the initially configured time. Every sixty seconds the clock signals the dynamic value function, which reads the clock, increments the dynamic value (T), and stores the incremented dynamic value as the dynamic value (T) for that time interval. In some embodiments the time value is provided in ISO-8601 format.

In some embodiments, the dynamic value (T) is provided by an external clock, for example, the clock of the communications terminal 140. In some embodiments, the dynamic value (T) changes based on some regularly-occurring action, for example, upon a request for an authentication code, or upon a received external signal. The regularly occurring action could be an event observable to the device 120 and preferably observable or roughly approximatable by the verifier 105 for example, a received radio signal, or an authentication attempt. Upon such a regularly occurring event, the dynamic value (T) changes. Such an event typically will not be an event that results in a change in event state (E). Thus, such an event typically will not be a reportable event.

In one embodiment, the secret (K), the dynamic value (T) and the event state (E) are provided to the combination function 230 for combination as authentication code A (K, T, E) 291. The combination of the secret (K), the dynamic value (T) and the event state (E) can take place in any order and can use one or more various combination methods. For example, in one simplistic embodiment, a one-way function such as a hash function, is applied to the values (K, T, E), and the result truncated to the right length, in order to arrive at a resulting authentication code. In another embodiment, at least two of the values (K, T, E), or portions thereof, are provided as input to the one-way function. A one-way function is a mathematical function that maps a universe of input values to a universe of output values in such a way that knowledge of the output of the function does not allow one to reconstruct the input provided. Examples of one-way functions are a hash functions, such as MD5 and SHA-1, and key derivation functions. In one particular embodiment, a block cipher, such as the RC6 or Rijndael (AES) algorithms, uses the secret (K) as the key and the dynamic value (T) as the data in order to generate the combination of (K) and (T). In one of these embodiments, the combination function 230 is designed such that each different event state (E) that is combined with a constant stored secret (K) and a dynamic value (T) results in a different authentication code value. As noted above, any order of combination is possible, and two of (K), (T), and (E) can be combined at the user authentication device 120 and the other combined with that result at the communication terminal 140.

User data (P) can also be provided as input to the combination function 230. The user data (P) is a unit of information such as an alphanumeric character string, or a strictly numerical value, for example a personal identification number (PIN) or password. In one embodiment, the user data (P) is information uniquely associated with the user 110. The user data (P) can also be obtained by biometric measurement or observation. In one embodiment, the identity or value of the user data is a secret known only to the user 110 and the verifier 105 (i.e., not to the device). The user data (P) can be stored in a manner accessible to the verifier 105 that protects it from being compromised. The user data (P) can be the actual PIN, password, biometric data, etc. that is provided by the user, or the user data value (P) can be the result of processing of the user data by one or more other functions. For example, the user data (P) can be mapped to another value with a one-way function, such as a hash function, or a key derivation function before being provided as an input to the combination function 230. Derivation functions can be used that combine the password with other information. For example, to increase security a random string of information referred to as a salt can be combined with the password prior to the application of the derivation function. The salt need not be a secret value. An iterative function can also be included in a derivation function. A number, referred to as an iteration count, can be used to indicate how many times to perform an underlying function by which the password is derived. The incorporation of the iteration count into the derivation function increases the effort required to derive a password. A modest number of iterations, for example 1000, is not likely to be a burden for legitimate parties when computing a key (e.g., user data), but it will be a significant burden for attackers. If the user data value is random and selected from a large number of possible values, a smaller iteration count can be used.

In one embodiment, the combination function 230 combines the user data value (P) with the secret (K), the dynamic value (T), and the event state (E) to generate an authentication code A (K, T, E, P) 292. The combination function 230 can combine these values (K, T, E, P) in any order (and with other values not mentioned) to generate the authentication code 292. In one particular embodiment, the user authentication device 120 first combines (K, T, E) to generate an authentication code A (K, T, E) 291 as described above. The combination function 230 then combines the generated authentication code 291 with the PIN (P) to generate an authentication code 292 that is a function of (K, T, E, P). The PIN (P) can be combined with A (K, T, E) by prepending or appending the PIN (P) to A (K, T, E), by arithmetically adding the PIN (P) to A (K, T, E), or using a block cipher or other one-way function, or other algorithm, or a combination of these and other techniques that combine two or more input values together. The same steps can be used for both combinations, or they can be different—for example, (K) can be provided as key input to a block cipher and (T, E) as data inputs to the block cipher, and the PIN combined with the block cipher result by an addition or exclusive-or operation. In another embodiment, the user data value (P) and the event state (E) are combined first for use as input to an encryption function, and then the dynamic value (T) and the secret (K) are combined with them by using them as a key to encrypt the result. In another embodiment, the dynamic value (T) and the secret (K) are combined, and the user data value (P) and the event state (E) are combined with the result. The combination can take place at the same time, for example, as the values are provided as input to a single function, or in stages, as some values are combined with others. Certain combinations can take place on the user authentication device 120 while others can take place on the communication terminal 140. Of course, it should be understood that the combination can include as variations other values or processing.

As described, various embodiments of the device 120 can receive input of the user data (P) in various ways. These can include without limitation, user input (e.g., of a PIN) via a keypad, a keyboard, a touch sensitive screen, selection with a pointer or mouse, handwriting recognition, voice recognition and so on. The user data can be read using a biometric reader that is integrated with the authentication device 120. The user data (P) can also be communicated from another device via electrical or electromagnetic means. It should be understood that there can be more than one item of user data (P), for example, provided by PIN entry and a fingerprint reader. Likewise, as another example, a PIN can be verified by the device, and data provided to the combination function in response to successful verification of the PIN by the device.

In various other embodiments, other data can be combined with the data just described (i.e., with or without the user data (P)) to generate the authentication code 293. This other data can include a generation value (N), which is incremented for each authentication code requested within a time interval. See co-pending U.S. patent application Ser. No. 10/010,769, entitled "Enhanced Time-Based Authentication," by Brainard et al., the contents of which are incorporated herein by reference.

The other data also can include a verifier identifier (V), which is a value associated with the identity of a particular verifier (105) or group of verifiers. The use of the verifier identifier (V) allows the same user authentication device 120 (with the same secret (K)) to be used with verifiers operated by different entities without giving a particular entity information that could be used to impersonate the user to another entity. See co-pending U.S. patent application Ser. No. 09/304,775, entitled "System and Method for Authentication Seed Distribution," by Brainard et al. the contents of which are incorporated herein by reference.

For example, in one embodiment, the combination function 230 combines a secret (K), a dynamic value (T), event state (E), user data (P), verifier identifier (V), and a generation value (N) to generate an authentication code 293. The combination function can combine these values (K, T, E, P, V, N) in various ways and in any order. Before being combined by the combination function 230, these values can be processed by one or more other functions. Various embodiments of the authentication device 120 can receive input of this data in various ways.

In one embodiment, the portion of the secret (K) used to generate an authentication code 290 changes over time. Portions of the secret (K) are derived from other portions based on the dynamic variable (T). For example, there can be a portion of the secret value (K) that is allocated for a particular time interval. In this embodiment, a portion of the secret (K) can be different for each second, each minute, each hour, each day, each month, or each year. This can be accomplished by representing secret (K) as a set of secrets: one corresponding to the current year ($K_Y$), one corresponding to the current month ($K_M$), one corresponding to the current day ($K_D$), one corresponding to the current hour ($K_H$), and one corresponding to the current minute ($K_{MIN}$), that is, K=($K_Y$, $K_M$, $K_D$, $K_H$, $K_{MIN}$) (or a subset or a function based on one or more of them), for each minute time value according to dynamic value (T). Thus, in these embodiments, portions of the secret (K) can be derived from each other, and a portion of the secret (K) can be used to generate the authentication code 290.

For example, the yearly secret ($K_Y$) can be generated by using a block cipher with a secret as the key and the current year, appropriately padded, as the data value. For example, in an embodiment using a 128 bit block cipher, the current year value (0000-9999) can be padded with 0's, 1's, or some random pattern that is known to the verifier 105, in order to provide a 128 bit data block. Thus, $K_Y=E_K$ (YYYYPPPPPP- PPPP) where P represents padding and $E_K$ represents a block cipher of the data YYYY using the secret as the key. In a similar manner, a monthly secret can be derived by applying the same or a different block cipher a second time: $K_M = E_{KY}$ (YYYYMMPPPPPPPPPP) where YYYYMM represents the current month and year values and the yearly secret is used as the key to the block cipher. Daily and hourly secrets can similarly be generated: $K_D = E_{KM}$ (YYYYMMDDPPPPPP) and $K_H = E_{KD}$ (YYYYMMDDHHPPPP).

In various embodiments, each of the secrets can be used during the relevant time interval to generate the authentication code. For example, the hourly secret can be used as the secret above, combined with the time and event state data to generate an authentication code. Although the above example has been given with respect to block ciphers, it will be understood that any of the methods described here for generating the secrets can be used (e.g. hash functions). Other techniques for generating new secret values are described in U.S. Pat. No. 5,361,062 to Weiss, entitled, "Personal Security System."

In another approach, the event state can be communicated in a manner such that it is not provided directly as input into the combination function. In one such embodiment, for example, the event state can be communicated by modifying the time provided by the device's clock in response to the event state. In an exemplary implementation of this embodiment, the device advances its clock by one or more minutes to indicate the occurrence of an event. The clock is decremented by one or more minutes to indicate another event. Provided that the device's clock and the verifier's clock have the required degree of accuracy, the verifier can determine the event state simply by determining whether the device's time is earlier, later, or the same as the time expected by the verifier. Moreover, it should be understood that other values and calculations can be used in combination with those described.

A challenge may also be an input to the combination function 230. In one implementation, the response is derived from a challenge, the secret key, and the event state, i.e., it is not derived from time. For example, a verifier-supplied challenge value could be used as the dynamic value (T) as described above.

Also, as part of the combination function, one or more values (e.g., the event state (E)) can be used to select data to be provided as input to mathematical operations. In one embodiment, there are two or more secrets (K) which can be used as input to the combination function. As part of the combination function, the value of the event state (E) is used to determine which of the secrets (K) will be used in the combination function to generate an authentication code. For example, in an implementation in which the event state (E) is one bit, and there are two secrets ($K_0$) and ($K_1$), an event state of 0 selects one secret (e.g., $K_0$) for use as K in the function 291 described above, and an event state of 1 selects the other secret (e.g., $K_1$). Thus, in an illustrative example, unless the device has been tampered with, the event state is 0, and the secret $K_0$ used in the function 291. Upon detection of tampering, the event state is set to 1, and the secret $K_1$ used in the function 291.

Figure 3:
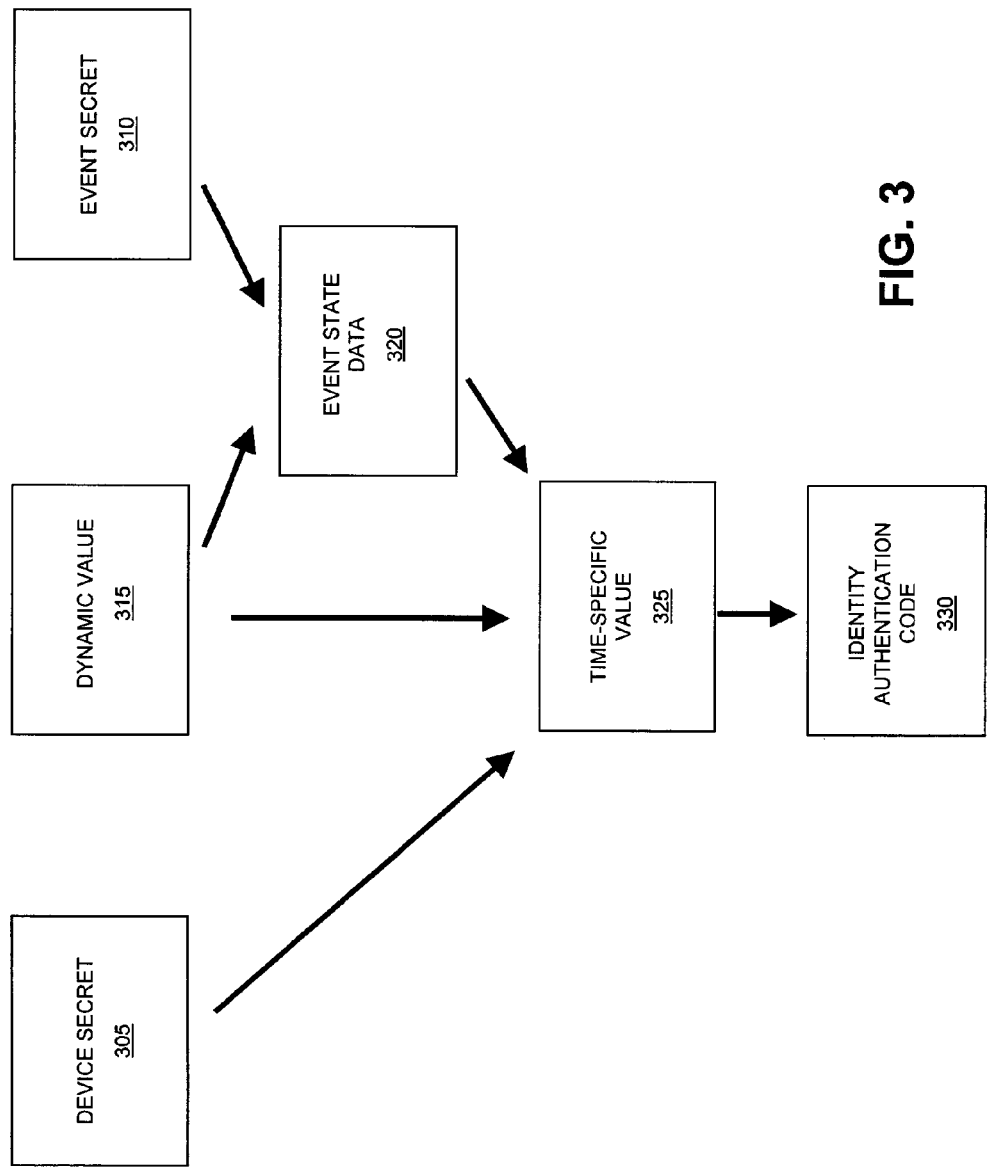
FIG. 3 is a block diagram depicting the generation of an authentication code according to an embodiment of the invention.

Referring now to FIG. 3, the data flow is shown for the operation of an embodiment that includes event state data 320 directly in the determination of an identity authentication code 330. An authentication device stores or calculates a first secret value, which is a device secret 305 associated with the device. This first secret value 305 can be the secret K described above, a portion of the secret K, or a variation or derivation thereof. The authentication device also stores or calculates a second secret value, an event secret 310 which is associated with the event state of the device. The event state represented by the event secret 310 is associated with an event which the device can communicate to a verifier. As mentioned, this may be a remarkable or anomalous event, not encountered in the usual operation of the device. The event secret 310 can be independent from the first secret value 305, derived from the first secret value 305, or the first secret value 305 and the value of the event secret 310 can be the same or derived from the same secret. The authentication device also has access to and/or calculates a dynamic value 315 which, as described, can be based on the current time as provided by a clock, or on another value, such as the number of authentication attempts, such that the dynamic value 315 changes over time.

Using the dynamic value 315 and the event secret 310, the authentication device 120 derives event state data 320 associated with a time period. In a version of this embodiment, the event state data 320 is a value represented by one or more bits of data. The event state data 320 can be determined in an iterative loop that is triggered by a change in the dynamic value 315, and/or the event secret 310. Additionally, the event secret 310 can be mathematically combined with all or a portion of the dynamic value 315. The event state data 320 is combined with the device secret 305 and the dynamic value 315 to form a time-specific value 325. The time-specific value 325 is then used to calculate the identity authentication code 330. The time-specific value 325 can be mathematically combined with a PIN, password, value derived from biometric reading, generation value, verifier identifier, and/or other information to form the identity authentication code 330. If event state data 320 is combined only with the dynamic value 315, then the attacker can determine whether the event state changed by requesting another authentication code before the dynamic value changes. Use of the generation value described above as input to the combination function, for example, will prevent this. Further, changing the event state each time the dynamic value is changed will make the state detection even more difficult for an attacker to determine.

In general, the occurrence of the event(s) associated with the event state results in the modification or some change associated with the event state data 320. In one embodiment, when a processor detects an event, it modifies event state data 320 stored in memory. In another embodiment, the event state data 320 is stored in memory that is inherently sensitive to an environmental event (e.g., electrostatic discharge) such that occurrence of the event will modify the event state data 320 without explicit action by the device. Also, the data store hardware for the event state data 320 can be designed such that an event (e.g., disassembly of the device) will automatically modify the event state data 320. The occurrence of the event associated with the event state data 320 can also result in the modification of the event secret 310. In this way, when new event state data 320 are generated, the new data will communicate the occurrence of the event. For certain events, however, it may be beneficial to only report (but not save) the current state by determining event state data 320 from the event secret 310 without modifying the event secret 310. This allows events to be reported for either a long-term or a short-term.

In one embodiment, the event state data 320 are stored in the form of bits each associated with a time period (e.g., an hour). The respective event state bit associated with a time period is used to derive the time specific value 325 for that time period. In this exemplary embodiment, there are two possible choices for the event state bit, but there may be multiple bits (and thus multiple states) in other implementations. When a verifier receives the identity authentication code 330, the verifier will determine whether the received code is an expected value. If not, the verifier will calculate the expected authentication code for the opposite state bit (i.e., replacing 1 with 0 or 0 with 1). If the verifier obtains the received identity authentication code with the opposite state bit, the verifier has determined that the event occurred, and can take appropriate action. In another embodiment, the event state data 320 is one bit, and is the same as the event secret 310. The one bit indicates whether or not the event has occurred.

Figure 4:
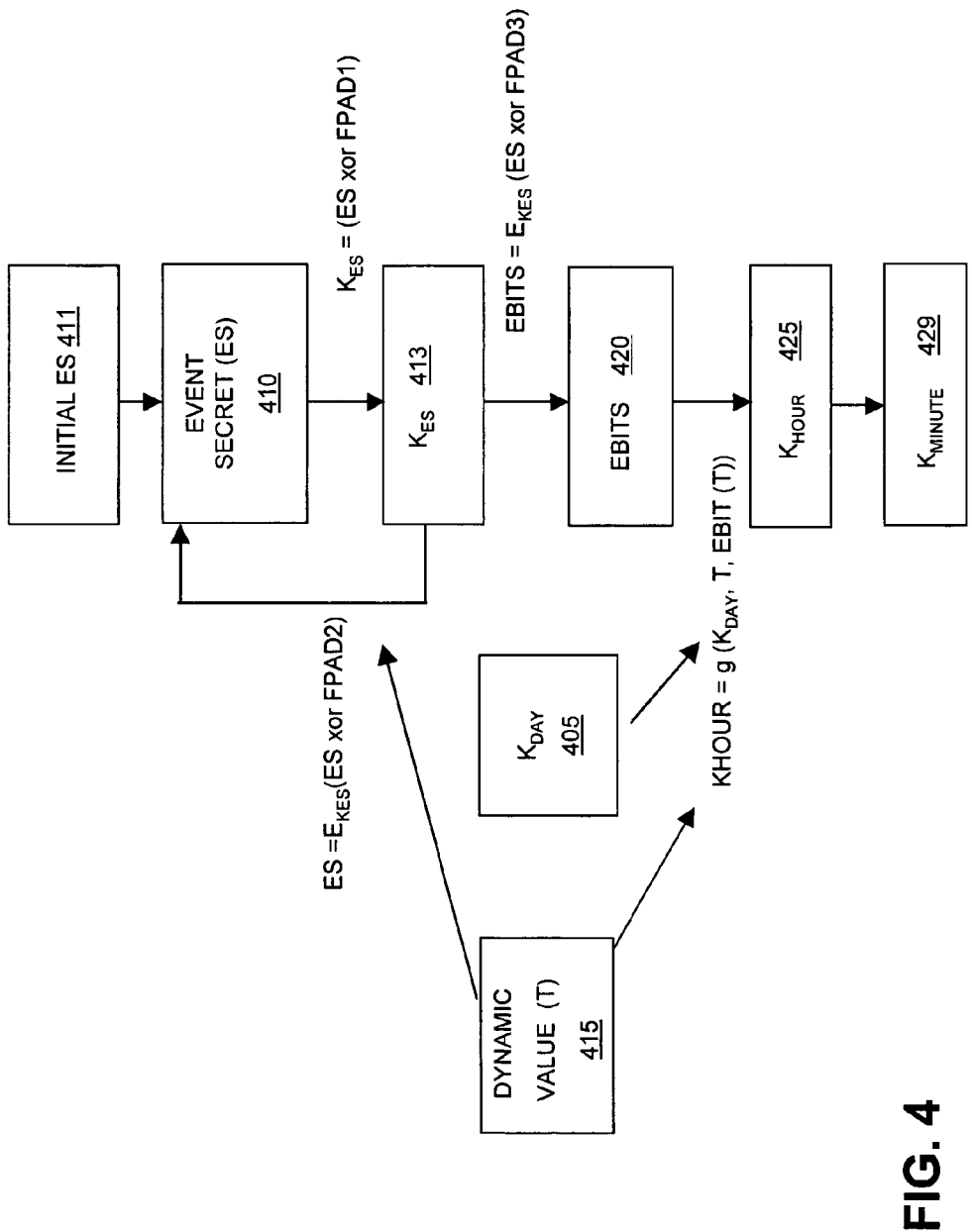
FIG. 4 is a block diagram depicting a detailed implementation of the embodiment of FIG. 3.

Referring to FIG. 4, an embodiment of a method for deriving authentication codes that communicate event state data is shown in which the value of the event secret (ES) 410 is repeatedly updated, for example, at the time that the dynamic value (T) 415 changes. In one embodiment, repeated updates prevent an attacker with access to event state data from determining whether an event has been detected, because the attacker cannot determine whether the changes to the event state data are the result of event detection or a routine update. Thus, event detection remains covert. In one embodiment, the event secret (ES) 410 is updated, or modified, regularly during normal operation, for example, when the dynamic value (T) 415 is updated. In another embodiment, the event secret (ES) 410 is regularly or periodically modified based upon some other interval or upon some other regular operation.

Upon the occurrence of a reportable event, the device takes an action to modify the event secret (ES) 410 in some way. For example, in some embodiments, the event secret (ES) 410 is modified one or more additional times upon occurrence of a triggering event and the modifications are made using the same function that is used for the regular modifications. In other implementations, upon the triggering event, the event secret (ES) 410 is modified using a different function than normally used, or by combining the event secret (ES) 410 with different data.

In one embodiment, the authentication device has a device secret (not shown) which is used in combination with the dynamic value (T) 415 to generate a secret associated with a day ($K_D$) 405. The day secret ($K_D$) is generated by encrypting information concerning the current date using the month encryption key KM. For example, $K_D=E_{KM}$ (T)$=E_{KM}$ (YYYYMMDDPPPPPP), where T represents the current dynamic value in a year-month-day format. The authentication device also stores the event secret (ES) 410, which in this embodiment has an initial value 411. In one version of this embodiment, the initial value 411 can be independent from the device secret. In another version, it is derived from the device secret. Also, the device secret and the initial value 411 can be the same or derived from a common value.

Periodically, as determined by the dynamic value (T) 415, a new value of the event secret (ES) 410 is derived using the event secret key ($K_{ES}$) 413, e.g., upon the first derivation, the initial value 411 is replaced. Changes to the value of the event secret key ($K_{ES}$) 413 also result in changes to event state bits ($E_{BITS}$) 420 which are derived from the event state secret (ES) 410 using the event secret key ($K_{ES}$) 413. The event state bit or bits (EBITS) 420 associated with a particular hour are then used to generate an identity authentication code.

In this embodiment, the event secret key ($K_{ES}$) 413 is derived according to the equation $K_{ES}$=(ES xor FPAD1), where FPAD1 is a predetermined constant value. At each update interval, the new value of the event secret (ES) 410 is derived by using the event secret key ($K_{ES}$) 413 to encrypt the results of a logical operation applied to the existing value of the event secret (ES) 410, for example, according to the equation ES=$E_{KES}$(ES xor FPAD2), where FPAD2 is also a predetermined constant value. Event state bits (EBITS) 420 are also derived by encrypting the results of a logical operation applied to the event secret (ES) 410, for example, according to the equation EBITS=$E_{KES}$(ES xor FPAD3), where FPAD3 is another predetermined constant value. Thus, to form the event state bits (EBITS) 420, an exclusive-or operation is applied to the event secret (ES) 410 and the FPAD3 constant value. In one embodiment, a group of 72 event state bits (EBITS) 420 are derived for each three-day period (i.e., a 72 hour period), and each of the event state bits 420 are each associated with an hour within the period.

The derivation of an authentication code based on the event state bits (EBITS) 420 may be completed by deriving additional secrets. First, a secret for the hour $K_H$ 425 is derived from the daily secret $K_D$, the dynamic value (T) 415, and the event state bit associated with that hour (EBITS(T)) by providing these values as input to a function (g), which can be a one-way function, message digest, block cipher, and so on. This can be written as $K_H$=g ($K_D$, T, EBITS(T)). A secret for a minute ($K_M$) 429 within the hour can be calculated using a function (f), which can be the same or different than the function (g), and where (f) takes as input ($K_H$) 425 and the dynamic value for the minute, which can be written as $K_M$=f ($K_H$, T). The minute secret ($K_M$) 429 can be used directly as an authentication code. Alternatively, the authentication code can be further derived from the minute secret ($K_M$) 429 for example by combining a PIN and/or other values as described.

Referring to FIG. 5 the contents of two value storage portions of device memory are shown in column 1 and column 2. Here, value 1 represents a secret value associated with the authentication device, and value 2 represents event state data associated with an event state. As actions occur, as shown in column 3, the actions can affect the example output (column 4) and/or the stored values (column 1, column 2). The leftmost column represents time increments beginning with initial time $T_1$ and ending at time $T_7$. Because events may not occur on a periodic basis, it should be noted that the length of time between two adjacent times (e.g., $T_1$ and $T_2$) may not equal the length of time represented by another pair of adjacent times (e.g., $T_2$ and $T_3$). In this example, the output is displayed on a screen, however, as previously mentioned, other means of output are possible. In one embodiment, the secret value (column 1) that is updated is not the master secret value, e.g., a master seed derived from the master secret value.

At a first time period $T_1$, the authentication device is initialized. This can be performed either during the manufacturing process, or in a later setup process. Initialization can be accomplished either remotely or locally, for example, by wirelessly transmitting the device secret to the mobile device or downloading the secret to a device that is connected to a network. The initialization process is performed such there is at least partial synchronization between the device and at least one verifier. Here, synchronize is used to mean that two or more devices (i.e., the authentication device and the verifier) obtain consistent representations of some information. This can include the verifier sharing the complete representation of data A1 stored as the device secret (column 1) and the complete representation of data B1 stored as the event state data (column 2). It can also include, for example, sharing a portion of the data, or a representation in the sense of a public key related to a stored private key in a public key encryption system.

At a second time period $T_2$, time has elapsed and according to a change in the dynamic value, the secret value (column 1) and the event state data (column 2) are updated. As shown in the table, the device secret has the value $A_2$ and the event state data (column 2) has the value $B_2$. In one embodiment, the update of the values are performed by replacing their old values by values that are derived from these, preferably using a one-way function. In another embodiment, the value of each bit that represents the secret value or the event state data could be changed to a state that is opposite the state present at the time of the update (e.g., an inverse operation). Other variations are possible, for example other sorts of modifications and combinations with other values.

At a third time $T_3$, the device secret in column 1 and event state data in column 2 respectively are the same as they were at time $T_2$, because the elapsed time since time $T_2$ is not sufficient to complete another update period for the dynamic value. In this example, at time $T_3$, a user enters a challenge and a correct PIN in the device, and obtains an output. In other embodiments, a challenge might not be used. In this example, the output (column 4) is a function of the device secret (column 1) and the event state data (column 2) as well as the challenge and PIN. It should be understood that entry of a challenge or a PIN is not a requirement of the invention even though it is included in this example. As described above, the output is communicated to a verifier, potentially along with the same or a different PIN or password, and a user identifier. The verifier determines whether the output is consistent with the state it believes the device to be in, which will be derived from $(A_2, B_2)$ and the other described values. If it is not, the verifier attempts to determine if there is a state with which it is consistent. Based on a conclusion of one of a set of acceptable states, the user can be granted some permission associated with his account, identity, or membership, or an alert triggered, and so on.

At a fourth time $T_4$, time again has elapsed and due to a change in the dynamic value, the device secret (column 1) and the event state data (column 2) are updated such that the device secret has the value $A_3$ and the event state data has the value $B_3$.

At a fifth time $T_5$, an event occurs, which triggers a change in the event state data (column 2). As described above, this change could be the result of a direct effect on the memory due to the event. The change could also be implemented by processor instructions as a result, for example, of an interrupt or a change in a polled signal line. As shown in the table, the device secret still has the value $A_3$ but the event state data now has the value $B_4$, which represents an updated or modified state. In this example, the update of the event state value is performed by replacing the old value $B_3$ by values that are derived from it, preferably using a one-way function. Replacement of the event state data (column 2) with a value that is known (e.g., an additional update) makes it possible for the verifier to determine whether there is an event occurrence recorded at the authentication device, as this change is reflected in future authentication codes. For example, the bits EBITS of the embodiment of FIG. 4 could be replaced.

At a sixth time $T_6$, time has again elapsed and according to a change in the dynamic value, the device secret value (column 1) and the event state data (column 2) are again updated. As shown in the table, the device secret now has the value $A_4$ and the event state data has the value $B_5$. The event state data is different from what it would have been had no event been registered at time $T_5$. This is because the values are updated by applying a function to their previous state; therefore, any modification will cause the event state data in future time periods to remain altered.

At time $T_7$, the user again enters a challenge and a correct PIN, and obtains an output value. The identity authentication code generated by the authentication device will be derived from the device secret $A_4$ (column 1) and the event state data $B_5$ (column 2). The output value is such that the user (or an observer) cannot determine without knowledge of the device secret or the original event state data that the event was registered in row five, even if an observer saved all communication between the user and a device, between the device and a verifier, and between a user and a device. Even so, the output value is still such that it can be detected by the verifier (upon verification of the value and associated information) that the registered event took place during or before the time of row 7. Thus, for example, an attacker who tampers with a token will remain unaware that event information is being transmitted to the verifier each time the altered token is used.

Referring again to the embodiment of FIG. 4, as an exemplary implementation, at time $T_5$, the used bits EBITS 420 (FIG. 4) are replaced. Thus, $B_5$ would be different at time $T_7$ from what it had been had the event not registered at time $T_5$. The change at time $T_5$ is included in later versions of the event state, and is reflected in the authentication code of time $T_7$.

In other implementations, it is possible that more information, such as the nature of the event and the time of the event, can be determined by the verifier. In this example, the verifier detects that the identity authentication code is a value associated with the user, but does not determine the event state. However, the value of the event state data can be modified in a manner which results in the generation of an authentication code, based on the event state data, that provides information concerning the nature and time of the event. For example, it is possible for one type of event to affect a first portion of the output, while not a second portion; whereas a second type of event can affect the second portion, but not the first. In some embodiments, the first and second portion can partially or fully overlap. If the first and second portion fully overlap, the two different events cause two different resulting output values, from which the verifier can determine not only that an event must have taken place, but also what type of event it was (i.e., the nature of the event). Similarly, the registration of an event during different time periods can affect different portions of the output, or cause the value of the output to fall within a different range of values. More detailed information concerning the event can also be communicated by, for example, associating a multi-bit value comprised of a plurality of event state bits 420 with each selected update period, e.g. an hour. The multi-bit binary value can allow for the communication of more information concerning the event than a single-bit value. For example, where the event is associated with the location of the device (e.g., is the device outside the U.S.?) there may only be two possible event states—yes or no. In this example, the nature of the event can be communicated with only a single bit. However, when the event state registers that the device is located outside the U.S., the verifier may be interested in more specific information concerning the location event. In this example, the event state can communicate one of a number of possible cities, countries, or regions, etc.

In either case, and as previously mentioned, it is only possible for the verifier (with whom the device has been at least partially synchronized at some point in time, whether by direct communication, or by proxy) to determine from the output, or distribution of the output, whether an event was registered; what event(s) were registered; and when the event(s) were registered by the device. It should be understood that the values in the different columns only are meant to illustrate the teachings of the invention, and that they can be longer, shorter, of a different format or representation, or a combination thereof.

If the verifier determines that the determined state is one associated with the authentication device that the verifier is communicating with, while it may not be an acceptable state for granting access, it is possible for the verifier to take a specific action, for example (without limitation) to alert authorities; block access to the account; cause an event to happen, where this event can later be registered by said device; or any combination of these. As mentioned above, there can be multiple states for an event. However, in the description of FIG. 5, only two general categories (acceptable vs. not acceptable) are used for simplicity of exposition. It should be understood that a person skilled in the art can easily extend the two categories of states to three or more, given the teachings here.

Figure 6:
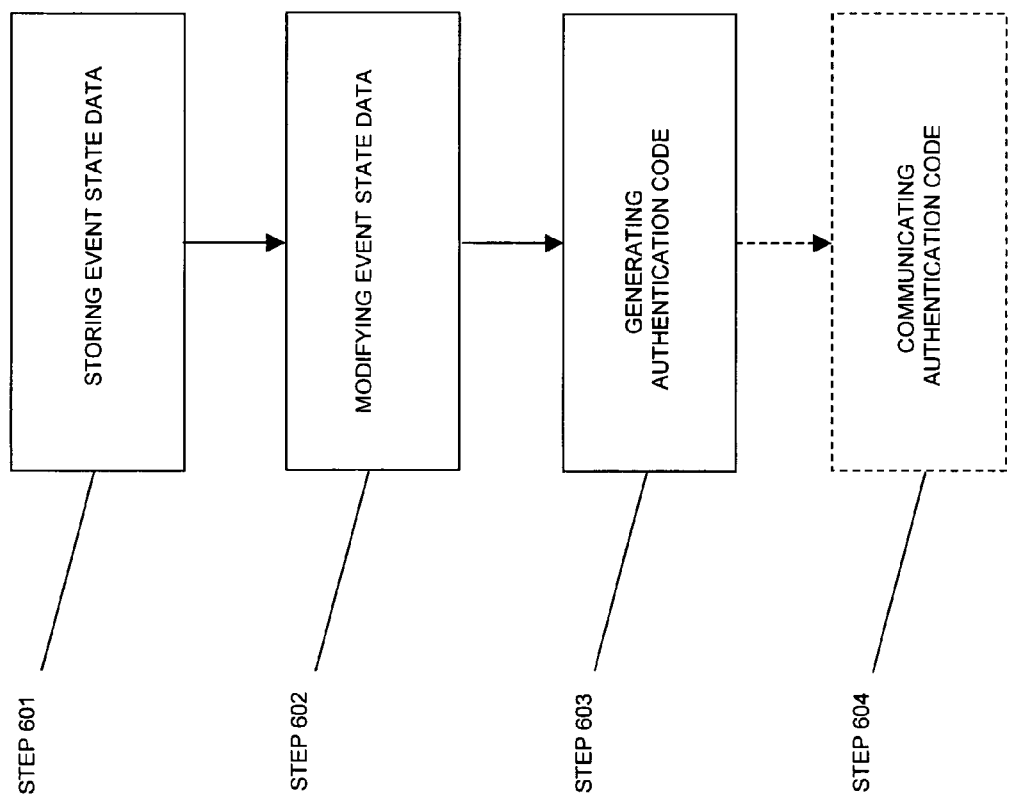
FIG. 6 is a flowchart depicting an embodiment of a method for generating an authentication code.

Referring to FIG. 6, in one embodiment, a method for generating an identity authentication code by an authentication device includes storing event state data in an authentication device (STEP 601). The event state data can be stored in multiple parts, for example with an event secret and separate event state bits, as in the embodiment of FIG. 4. The event state value representative of the occurrence of an event can be stored in a data store such as a conventional memory, which can be internal to or external to a processor. The event state data can be stored in a memory that is sensitive to the event, such that the event causes a memory modification without processor or other intervention. The event state data can be an electronic signal or port that is read by a processor. The event state data can be continuously updated. For example, the event state can include a memory that is continuously updated upon an appropriate change in a dynamic variable, with a function of itself, for example as described with reference to FIG. 5. The event state data can be stored as a value associated with the event state and bits derived from the value. In one such embodiment, the bits are each associated with a time interval.

The method also includes the step of modifying the event state data in response to an event (STEP 602). This modification can be accomplished by a processor receiving an appropriate signal, from a switch or otherwise. The event state data store can be designed such that the occurrence of the event inherently modifies the event state data. For example, electrical terminals of a memory can be connected to the device case such that removal of the case will change the memory contents.

As described above, the event can take many forms, and can be an unusual, or remarkable event, or an event that is not associated with normal operation of the authentication device. In general, authentication will not be as efficient if there is not a single expected state, because the verifier will have to compute the authentication codes associated with the other event states. Non-limiting examples of unusual events include tampering with the device (e.g., trigger of a case switch), and events external to the device, such as an environmental event (e.g., temperature or radiation exposure), incorrect power input (e.g., too high or too low), and so on. The event can also include the absence of such an event (e.g., power normal).

The modification can include immediately storing a first value in the event state data store, and thereafter storing a second value in the same data store or in another data store. If the values are stored in two different data stores, they still can overlap in part. The immediately stored value can be deterministically computed, or it could be a constant, such as 0 or 1. The immediate data storage can be asynchronous meaning here that it is not updated synchronous with a processor or other hardware clock. The second value can be at least partially non-deterministic, for example if it is calculated from the original value, for example using a one-way function.

The method also includes generating an identity authentication code that depends at least in part on a dynamic value, the event state data, and a secret associated with the device (STEP 603). The generated authentication code can also depend on user data, such as one or more of a PIN, a password, and data derived from a biometric observation. The user can provide this data to the authentication device. Some user data can be stored on the authentication device, possibly in encrypted form. The user can provide some input to the authentication device (i.e. biometric data) and the authentication device can decrypt other data.

The authentication device can verify the correctness of user data, and only provide an identity authentication code if the user data is correct. The presentation of incorrect user data a number of times can, in some embodiments, result in the modification of event state, so that the continued presentation of incorrect user data is reported to the verifier.

Authentication information including the identity authentication code is communicated to a verifier (STEP 604). As mentioned, the communication to the verifier can take place with or without human intervention. The verifier receives the authentication information, which can optionally include other authentication and identification data, such as a PIN, password, biometric reading, and the like. The verifier has access to a dynamic value and a secret associated with the device that can be the same, derived from, or related to the information stored or accessed by the authentication device. The verifier can verify the identity of the user and determine the event state in response to the received authentication code.

As described above, through appropriate design, the communication of the event state can take place such that only the authentication device and the verifier are aware of the communicated state.

Figure 7:
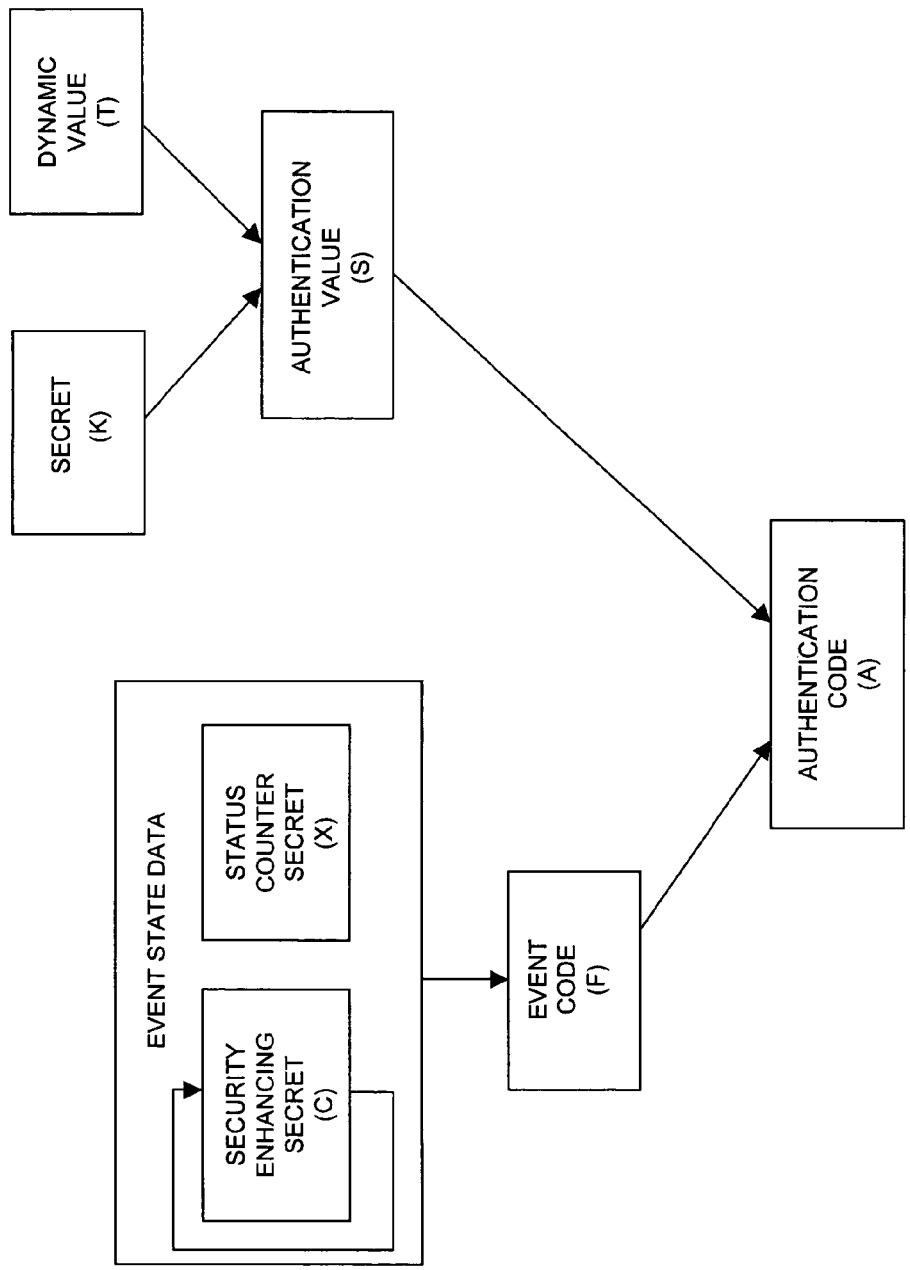
FIG. 7 is a block diagram depicting the generation of an authentication code according to an embodiment of the invention.

Referring to FIG. 7, in one embodiment, the event state data comprises two secret values. The first secret value is a security enhancing secret (C). The second secret value is a status counter secret (X). In a version of this embodiment, each of the security enhancing secret (C) and the status counter secret (X) comprise bit strings of sufficient length to achieve strong cryptographic security, e.g., at least 80 bits. Regardless of their length, each secret (C) and (X) can be updated via a one-way cryptographic transformation such as a hash function, block cipher and the like. The security enhancing secret (C) is periodically updated. For example, when the security enhancing secret (C) is employed in an authentication device 120 (e.g., a token) the secret (C) can be updated at each time interval in which a new identity authentication code is produced for the token. As is described below, the time-varying nature of security enhancing secret (C) improves the security of the embodiment because possession of past values of the security enhancing secret (C) are generally not useful to attackers. The status counter secret (X) is updated on the detection of an event. The extent of the update that is made to status counter secret (X) can depend upon the quantity of events that are detected, the nature of detected events, or both. When updates to the status counter secret (X) are made to indicate the nature of the detected events, a classification system can be employed so that a specific update value corresponds to a specific detectable event. For example, different values of X can refer to different events or event states.

An event code (F) is a value that is the result, at least in part, of the combination of the security enhancing secret (C) and the status counter secret (X). For example, the event code (F) value can be some portion of an output of a function that is applied to secrets (C) and (X). In one version, the event code (F) is some portion of the value that results when an exclusive-or operation is applied to (X) and (C). If the status counter secret (X) is a strong secret, this approach is advantageous because it provides forward-secure encryption. In another version, the event code (F) is some portion of the value of status counter secret (X) encrypted under a standard symmetric cipher (e.g., AES) where security enhancing secret (C) is employed as the secret key. As used here, the term portion refers to values comprised of the whole or some part thereof.

The event code (F) can be used to generate authentication codes that communicate the quantity of detected events, the nature of detected events or both. For example, as shown, the event code (F) can be combined with an authentication value (S), which is, a value resulting from the combination of secret (K) and dynamic value (T). The result of combining (F) and (S) is the authentication code (A). In one embodiment, the authentication code (A) is some portion of the value that results when an exclusive-or operation is applied to event code (F) and authentication value (S). Alternatively, the authentication code (A) is derived when a message authentication code (MAC) is applied to event code (F) where authentication value (S) is employed as the secret key.

For the purpose of the following description, the authentication code generated by the authentication device 120 is represented by ($A_D$) in order to distinguish it from the authentication code generated by the verifier, also using the technique just described, which will be referred to as ($A_V$).

The authentication code ($A_D$) is transmitted to a verifier for verification. In one embodiment, the verifier attempts to reconstruct authentication code ($A_D$) by updating the security enhancing secret (C) for the current time in a manner similar or synchronized with the authentication device, and computing the current authentication value (S). The verifier also employs the stored value of the status counter secret (X) and security enhancing secret (C) to derive event code (F) as previously described. The verifier employs the values of the event code (F) and the security enhancing secret (C) to derive a first authentication code ($A_{1V}$). The verifier compares the value of the first authentication code ($A_{1V}$) with the value of the received authentication code ($A_D$) generated by the authentication device 120. The authentication code ($A_D$) is accepted by the verifier if ($A_D$) is equal to ($A_{1V}$).

If the received authentication code ($A_D$) does not equal first authentication code ($A_{1V}$), the value of status counter secret (X) that is stored by the verifier is updated. The updated value of status counter secret (X) is used to derive an updated value of event code (F). The verifier then employs the updated value of event code (F) and the security enhancing secret (C) to derive a second authentication code ($A_{2V}$). Again, the authentication code derived by the verifier (i.e., ($A_{2V}$) in this iteration) is compared with authentication code ($A_D$). If ($A_D$) is equal to ($A_{2V}$) the verifier can determine the quantity and/or nature of any events indicated by the value of status counter secret (X). The verifier can employ this knowledge to authenticate the authentication code ($A_D$), determine that authentication code ($A_D$) is invalid, notify a trusted authority that one or more events have occurred (e.g., device tampering), or a combination thereof. Additionally, where appropriate the verifier can also notify the user 110 of the event, notify the issuing authority of the event, or both. If authentication code ($A_D$) does not equal second authentication code ($A_{2V}$), the verifier can repeat the process of updating status counter secret (X) and deriving values of event code (F) and authentication code ($A_V$) until the value of status counter secret (X) that produces authentication code ($A_D$) is determined. Alternatively, the verifier can determine that authentication code ($A_D$) is invalid without repeating the authentication process for a particular authentication code ($A_D$) supplied by authentication device 120. If the received authentication code ($A_D$) does not match the expected authentication code ($A_{1V}$), the verifier can also calculate additional authentication codes associated with adjacent time periods to account for possible clock drift between the authentication device and the verifier.

In one embodiment, a verifier can also efficiently determine the event or events corresponding to the value of status counter secret (X) that an authentication code ($A_D$) is, in part, derived from when the event code (F) and the status counter secret (X) are derived in a particular manner. In a version of this embodiment, the event code is event state data. Specifically, where both event code (F) is derived from an exclusive-or applied to security enhancing secret (C) and status counter secret (X), and authentication code ($A_D$) is derived from an exclusive-or applied to event code (F) and authentication value (S), the verifier can efficiently compute the status counter secret ($X_D$) corresponding to authentication code ($A_D$). First, the verifier computes event code ($F_D$) corresponding to the authentication code ($A_D$) as a function of an exclusive-or operation applied to authentication value (S) and authentication code ($A_D$). Next, the verifier computes corresponding status counter secret ($X_D$) as a function of an exclusive-or operation applied to event code ($F_D$) and security enhancing secret (C). As described in the previous example, the process can be repeated until either the verifier can determine the quantity and/or nature of any events indicated by status counter secret ($X_D$) or the authentication code ($A_D$) is invalidated.

Figure 8:
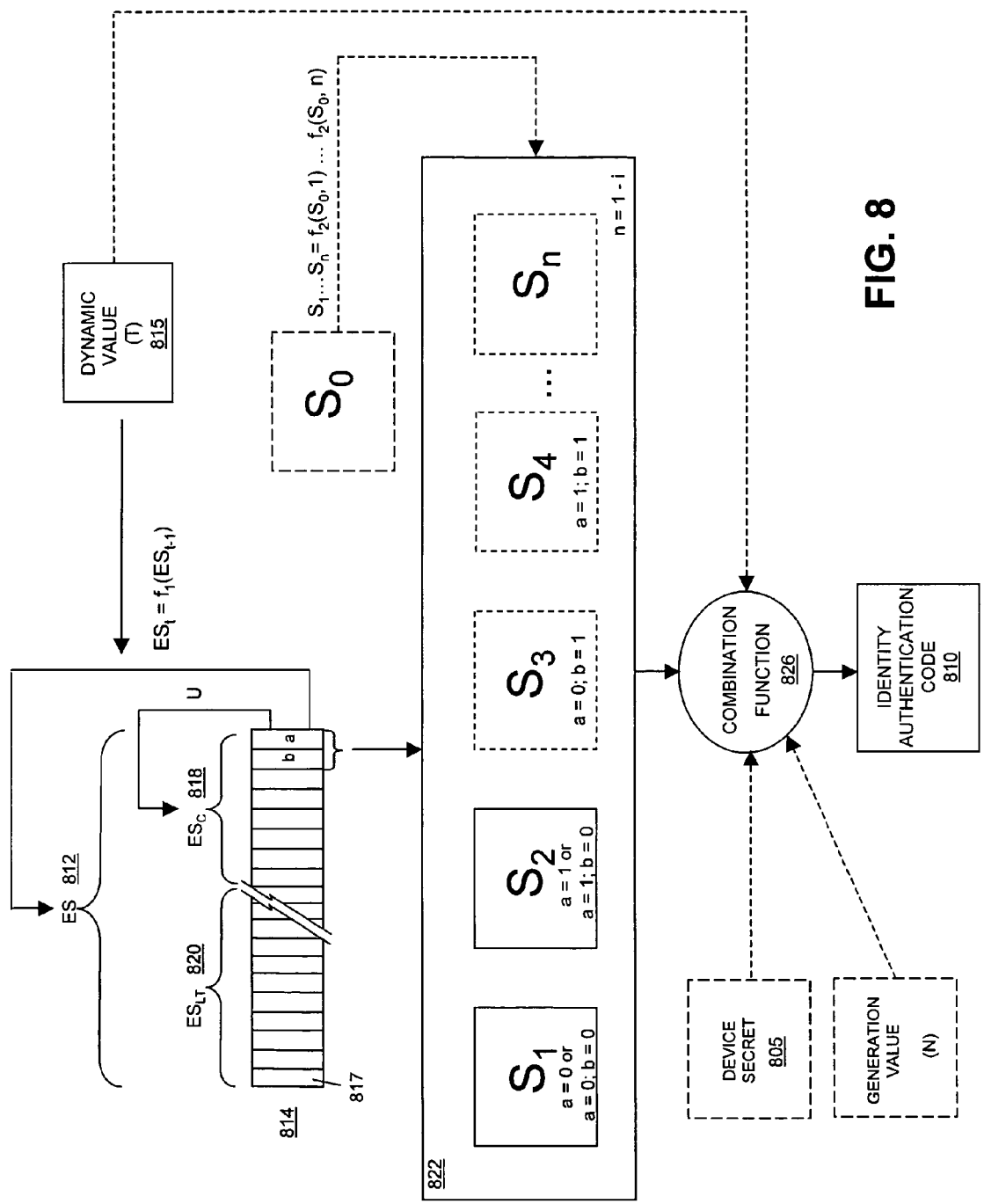
FIG. 8 is a block diagram depicting the generation of an authentication code according to an embodiment of the invention.

Referring now to FIG. 8, in one embodiment, a system for authentication and event state communication is one implementation of a design to make it difficult for an attacker who has access to the device to determine if an event was detected by an authentication device 120 and/or communicated in an authentication code 810.

In an authentication device 120, event state data 812 is stored in a memory, such as a register 814. (A verifier can store event state data 812 for one or more authentication devices 120 in a similar manner.) Event state data 812 is periodically updated, for example in response to a change in dynamic value (T) 815. These scheduled updates are made by both the authentication device 120 and the verifier. A register 814 for such a system can be initialized by employing a random value known by both the authentication device 120 and the verifier but no one else.

In one implementation, the event state data 812 itself is updated simply by applying the event state data as the input (or one of the inputs) to a one way function. This is shown in the figure as $ES_t = f_1(ES_{t-1})$, where in this example, $ES_t$ is the current event state data 812, $ES_{t-1}$ is the event state data 812 from the previous period, and $f_1$ is a one way function such as a hash function (e.g., MD5 and SHA-1), key derivation functions, and the like. Other operations (e.g., bit-swapping, math operations) can also be performed as part of the updating function f, and other data, such as a device secret, can also be included in the updating operation. This periodic updating is deterministic such that the event state data is predictable at a given time to those devices and entities that know both the value of $ES_{t-1}$ and the algorithm that is being employed in the updating operation. This predictability allows the event state data 812 that is provided by the authentication device 120 to match the event state data 812 that is predicted by the verifier provided that the verifier is appropriately synchronized with the authentication device.

Because a past value of the event state data 812 is employed in deriving the next value of the event state data 812, past events have a continuing impact on later derived values of the event state data 812. For example, at a given time $T_1$, the event state data 812 will have a particular value, and at a second time $T_2$, the event state data 812 will have (with very high probability) a different value, which is predictable to a verifier. However, the event state data 812 is not predictable to an observer who does not know the original value. The observer's uncertainty about the starting time may also be an obstacle. An attacker who gains access to the event state data 812 will know when the data is updated, but will not know how the event state data 812 relates to previous event state data 812, i.e., whether the previous event state data 812 was simply updated, or previously modified and/or updated with different operations, or at a different time, than the normal operation. Thus, it is not possible for the attacker to recreate a past value of the event state data 812 to eliminate evidence of the occurrence of an event that the attacker does not want revealed (e.g., device tampering).

Upon the occurrence of an event, the event state data 812 of the authentication device 120 is modified in a manner that is different than it otherwise would be during normal operation. These unscheduled updates (U) modify all or a portion of the event state data 812 in a manner that corresponds to the occurrence of the detected event, the nature of the event, the state of the event or a combination of the nature and the state. In one embodiment, upon occurrence of the event, the event state data 812 has a value that is for the next time period, rather than the current time period. This approach has the advantage of making the operation of the device (i.e., event state data updating) appear normal, as the attacker will likely not know if the update was a result of event detection or normal operation. In another embodiment, when an event occurs, a different method of performing unscheduled updates (U) is used to update the event state data 812 than the method employed to generate the periodic updates. In one such implementation, secret data (not shown), which may or may not be the device secret 802, is used in performing unscheduled updates (U). For example, the secret data or a value derived from the secret data can replace, or can be combined with the event state data 812.

The register 814 includes a plurality of bits 817 (e.g., a and b) and can include a first portion 818 and a second portion 820. When the event state data 812 is split into two or more portions, where one or more portions can indicate the current event state ($ES_c$) 818, and one or more portions can correspond to previously detected events ($ES_{LT}$) 820. In one embodiment, the periodic updates modify (e.g., set, reset, or perform operations using other data) the bits corresponding to the current event state ($ES_c$) 818 while leaving the long-term event state ($ES_{LT}$) 820 unchanged. In this example, both the long term event state ($ES_{LT}$) 820 and the current event state ($ES_c$) 818 are used in the updating operation.

In FIG. 8, the long-term event state data 820 and the current event state data 818 are shown as continuous portions comprised of adjacent bits 817. However, either or both of the long term event state data 820 and the current event state data 818 can be partitioned into non-adjacent portions of register 814. These portions can be comprised of a single bit, adjacent bits, non-adjacent bits, or bits 817 that are selected from the register 814 in some other deterministic fashion. Further, each of the long-term event state data 820 and the current event state data 818 can employ none of the same bits, some of the same bits, or all of the same bits. Where an apportioned register 814 is employed, an event that occurs during the present time period can, in one version, only act to update the value of the portion of the register 814 that contains information concerning the current event state data, e.g. ($ES_c$) 818. Thus, the detection of an event can have a long-term or short-term effect, depending on what portion of the event state data is modified.

In one embodiment, a selector 822 selects a secret from a plurality of secrets, shown in the figure as $S_1$, $S_2$, etc., which can be employed in generating an identity authentication code 810. The plurality of secrets are values that are generated in a manner that prevents their disclosure to an attacker, for example, the secrets can be the result of a random number generator, a cryptographic algorithm and the like.

A portion of the event state data stored in register 814 is used at a particular time to select from two or more secrets $S_1, \ldots, S_n$. For example, if there are two secrets $S_1$ and $S_2$, one bit (a) can be used to select between the two secrets, e.g., $S_1$ if a=0; and $S_2$ if a=1. If there are four secrets $S_1$, $S_2$, $S_3$, $S_4$ two bits (ab) can be used to select between the secrets, e.g., S1 if a=0, b=0; $S_2$ if a=1, b=0; $S_3$ if a=0, b=1; and $S_4$ if a=1, b=1. The selected secret is supplied by the selector 822 to a combination function 826 to generate the authentication code 810. Thus, the authentication code 810 provides the verifier with information concerning an event's occurrence and/or the nature of the event. Of course, other variations are possible. For example, a portion of the selected secret itself could be used as the authentication code.

In a further embodiment, a multi-level hierarchy of secrets is employed. One general example of a multi-level hierarchy is a set of values that include a month seed, a day seed, an hour seed, and a minute seed. In this example, the month seed is the highest level seed because it is required in order to determine the values of the day seed, the hour seed, and the minute seed. In the embodiment shown in FIG. 8, each secret $S_1, \ldots, S_n$ is generated from parent secret $S_0$, which could be the month seed, for example. Each secret is thus a different potential day seed. In one implementation of this embodiment, a secret is generated when, for each secret $S_n$, a function ($f_2$) is applied to parent secret $S_0$ and the corresponding secret number (n). The function ($f_2$) can be a one way function such as a hash function (e.g., MD5 and SHA-1), key derivation functions and the like. The secrets $S_1, \ldots, S_n$ generated in this fashion will also be periodically updated when the parent secret $S_0$ is updated. Thus, when a new day secret is generated, new event secrets can be generated as well. In a further version of this embodiment, the secret from the previous time period (e.g., $S_n$ at $T_1$) can also be supplied as an input to function ($f_2$) to generate the secret for the present time period (e.g., $S_n$ at $T_2$).

In general, the combination function 826 generates the authentication code 810 using data that is stored onboard the authentication device 120 and/or remotely accessed during the authentication process. As shown, the data can include values such as a secret $S1, \ldots, S_n$ representing the occurrence of one or more events, a device secret 805, dynamic value (T) 815, a generation value (N), and the like. As in the other examples, values derived from these values could be used (e.g., a dynamic value, or a month seed derived from a device secret instead of a device secret). Likewise, additional values can be included in the combination function (e.g., a challenge value or other data).

In a version of this embodiment, a seven bit register 814 results in 128 available secrets, e.g., $S_1, \ldots, S_{128}$. However, the register 814 can be much larger, for example, 160 bits. The large register 814 size provides an opportunity to vastly increase the number of available secrets that can be selected. It should not be necessary, however, to expand the number of available secrets beyond the number required to provide the desired security level. This can be avoided by selecting only a portion of the total register 814 for use in providing event state data 820. Likewise, as another example, the register can be used for an hour, with two different bits used for each minute.

In other embodiments, the updates to event state data 812, updates to secrets $S_1, \ldots, S_n$, or some combination, result at least in part from challenges that the authentication device 120 receives from the verifier.

When a verifier receives the identity authentication code 810, the verifier determines, based on the known event state data 812, whether the received code 810 is an expected value. If it is not, the verifier calculates the expected authentication code 810 for one or more additional values of the event state data 812. Where a single bit of the event state data 812 is employed to generate the secret, there are only two possible event states. As a result, there are only two possible authentication codes 810 that could be provided by a valid authentication device 120, for example, a first authentication code derived using $S_1$, and a second authentication code derived using $S_2$.

When two bits are employed for selection, the verifier can determine whether the authentication code 810 was generated by any of the four possible events states of a valid authentication device 120 (e.g., 00, 01, 10, 11). When two bits are used, the verifier would compare the received code with the received codes that would be generated by secrets $S_1, S_2, S_3$ and $S_4$, and determine whether the authentication code indicates that an event took place or if an invalid authentication code was received. As described above, a larger the number of bits 817 included in the plurality of bits 817 increases both the number of potentially valid secrets, and the number of potentially valid authentication codes 810. However, these calculations performed by the verifier can be more rapidly completed where the verifier begins by calculating authentication codes 810 based on the most likely secret (i.e., the most likely value of the event state data 812). For example, the verifier will know the value of the event state data 812 at each of the preceding authentications. The verifier's knowledge reduces the number of iterations required before the verifier determines the event state of a valid authentication device 120, or the invalidity of the authentication code 810. Where event state data 812 is formed from a large number of bits 817, the reduced number of iterations can substantially increase the verifier's efficiency in processing authentication codes 810. Of course, a verifier that knows only how to generate the secrets $S_1, \ldots, S_n$, but not the event state data 812 can still verify an authentication code by trying each secret to see if one works, but lacks the preceding efficiency advantage and cannot determine the event state.

Alternatively, the authentication code 810 can include information that allows the verifier to immediately determine one or both of the time and the event state that the authentication code 810 is derived from without the need to perform iterative computations. In one embodiment, such an approach is implemented by including explicit information in the authentication code 810 that hints or suggests the time and/or event state.

The verifier may consider that an unscheduled update may have occurred when the event state corresponding to an authentication code is unexpected. The verifier may then recalculate the event state assuming that an unscheduled updated had occurred at some time between previous scheduled updates. If the recalculated event states continue to match event states corresponding to authentication codes in future authentication operations, the verifier may conclude that the unscheduled update has occurred at a particular time. Alternately, the verifier may conclude that an unscheduled updated has occurred without determining the time.

When an unscheduled update is detected by the verifier, the verifier can update the verifier's data concerning the authentication device 120 so that the results of future periodic updates performed by the verifier will correspond to the results of future periodic updates performed by the authentication device.

One or more of the preceding embodiments can be employed in a system that includes one or more master verifiers and one or more subordinate verifiers. Generally, the master verifier is more remote than the subordinate verifier from the communication terminal 140 employed during an authentication. In one embodiment, a master verifier stores the information required to calculate each secret and corresponding authentication code for one or more authentication devices 120. To facilitate authentication with authorized verifiers, both the authentication devices 120 and the master verifiers employed in this approach derive temporary secrets for each period. However, a subordinate verifier can only authenticate codes that are presented to it when it has received the secrets from a master verifier. Further, the secrets received by the subordinate verifier are only valid during specific periods of time (i.e., they are temporary secrets) and they are only valid for a limited number of authentication devices. As a result, the subordinate verifier only can authenticate for a reduced period of time. The periods during which the subordinate verifier can authenticate are limited to those periods for which the subordinate verifier possesses valid secrets that are used to generate authentication codes. This approach can be advantageous because it reduces damage that an attacker can do if the subordinate verifier is compromised.

A subordinate verifier subscribes to updates of the secrets and receives temporary secrets from the master verifier either on request, at scheduled updates, or both. These temporary secrets can be limited for use only during a specific period, e.g., a month, a day, an hour, etc. Additionally, or as an alternative, a set quantity of temporary secrets can be supplied where each secret can be used once at any time prior to the end of an expiration period. Some values that can be employed as temporary secrets include, for example, device secret (K), dynamic value (T), and event state data (E) of FIG. 2. Alternatively, the temporary secrets of the preceding embodiments can be generated from a temporary master secret that is also only valid for a single period. In this alternative approach, the master verifier provides each of the subscribing subordinate servers with the temporary master secret that is employed to generate one or more of the device secret (K), dynamic value (T), and event state (E) for that period.

In a further embodiment that is also compatible with one or more of the preceding embodiments, intermediate servers are employed to facilitate the communication of information between the verifier 105 and the authentication device 120. This approach is advantageous because it increases the utility of authentication devices 120. For example, an authentication code can be presented to a system that generally does not participate with the authentication system 100, e.g., a system that lacks a verifier 105. In this embodiment, the intermediate server will communicate with the verifier 105 to complete the authentication.

One or more of the preceding approaches can also employ techniques to prevent an attacker from detecting past values of the event state and the event state data. This technique can be employed to prevent successful attacks by attackers who have access to the physical memory of authentication device 120. Such attacks have a potential for success because values stored in a memory for an extended period can burn themselves into the memory. Later attempts to erase or overwrite these values can not eliminate this hidden information from a properly equipped attacker. Magnetic storage media also suffers from undesired long term memory of previously stored values. As in the case of values stored in RAM, these past values can also be recovered by an attacker who has access to the memory.

In one embodiment, the frequent periodic update of event state data prevents burn in of past values of the event state data. In another embodiment, the event state data is cyrptographically protected. For example, event state data can be stored in more than one register or in separate portions of the same register. Using this approach, an exclusive or operation can be applied to values that together form the event state data, and those values can be updated over time. The result is that the actual values of the event state data are not stored directly and no single value can burn in, but the event state data can still be easily determined. This method can be employed in conjunction with the previously described periodic updates. Such techniques are described, for example, in Di Crescenzo et al. "How to Forget a Secret," Symposium on Theoretical Aspects in Computer Science, 1999, the contents of which are herein incorporated by reference.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of generating an identity authentication code associated with an authentication device, comprising:
   providing event state data that specifies an operating condition of the authentication device, the operating condition specifying information on the likelihood that the authentication device has or will develop an operational problem; and
   generating an identity authentication code that depends on (i) the event state data, and (ii) a secret associated with the device;
   wherein the operating condition of the authentication device includes information about whether a battery supplying power to the authentication device has fallen below an expected power level.

2. The method of claim 1, wherein the identity authentication code further depends on a dynamic value.

3. The method of claim 2, wherein the dynamic value includes one or more of a time value, a challenge, and a counter.

4. The method of claim 1, further including changing the event state data when the operating condition of the authentication device changes.

5. The method of claim 1, wherein the operating condition of the device is covertly encoded in the identity authentication code.

6. The method of claim 1, wherein the event state data is derived from an associated event secret.

7. The method of claim 6, further including periodically changing the event secret.

8. The method of claim 6, further including changing the event secret each time the dynamic value changes.

9. The method of claim 1, wherein the event state data includes one or more event state bits, a subset of bits being employed in generating identity authentication codes for different time intervals.

10. The method of claim 2, wherein the operational problem is a device reset.

11. The method of claim 2, wherein the identity authentication code further depends on of one or more of a PIN, a password, data derived from a biometric observation, user data, verifier data, and a generation value.

12. The method of claim 2, further including, before generating the authentication code, receiving user input data, wherein the user input data is at least one of a PIN, a password, and biometric data.

13. The method of claim 12, further including, before generating the authentication code, verifying whether the user input data is correct, and providing the identity authentication code only if the user input data is verified to be correct.

14. The method of claim 2, further including transmitting the identity authentication code to a verifier.

15. The method of claim 14, further including receiving, by the verifier, authentication information comprising the identity authentication code; and,
   determining, by the verifier, the correctness of the identity authentication code and the event state data.

16. The method of claim 14, wherein the verifier includes a representation of the secret associated with the device.

17. The method of claim 15, wherein the authentication information further includes a user identifier.

18. The method of claim 15, wherein the authentication information further includes at least one of a PIN, a password, and biometric data.

19. The method of claim 2, further including the step of displaying the identity authentication code on the device.

20. A method of generating an identity authentication code associated with an authentication device, comprising:
   providing event state data that is a security indicator for an authentication system of which the authentication device is a component; and,
   generating an identity authentication code that depends on (ii the event state data, and (ii) a secret associated with the device:
   wherein the security indicator includes information regarding a length of time the authentication device has been inserted into a device reader.

21. The method of claim 20, wherein the identity authentication code further depends on a dynamic value.

22. The method of claim 21, wherein the dynamic value includes one or more of a time value, a challenge, and a counter.

23. The method of claim 20, wherein the security indicator includes information regarding strength of a biometric match, 24. The method of claim 20, wherein the security indicator includes information regarding accuracy of a PIN entry.

25. The method of claim 20, wherein the security indicator includes information regarding a device type associated with the authentication device.

26. The method of claim 20, wherein the security indicator includes information regarding a device signature or pattern associated with the authentication device.

27. A method of generating an identity authentication code associated with an authentication device, comprising:
   providing event state data that is a security indicator for an authentication system of which the authentication device is a component; and,
   generating an identity authentication code that depends on (i) the event state data, and (ii) a secret associated with the device:
   wherein the security indicator includes information regarding a protection level of the secret associated with the device.

28. The method of claim 20, wherein the identity authentication code further depends on one or more of a PIN, a password, data derived from a biometric observation, user data, verifier data, and a generation value.

29. The method of claim 20, further including, before generating the authentication code, receiving user input data, wherein the user input data is at least one of a PIN, a password, and biometric data.

30. The method of claim 29, further including, before generating the authentication code, verifying whether the user input data is correct, and providing the identity authentication code only if the user input data is verified to be correct.

31. The method of claim 20, further including transmitting the identity authentication code to a verifier.

32. The method of claim 31, further including receiving, by the verifier, authentication information comprising the identity authentication code; and,
determining, by the verifier, the correctness of the identity authentication code and the event state data.

33. The method of claim 31, wherein the verifier includes a representation of the secret associated with the device.

34. The method of claim 32, wherein the authentication information further includes a user identifier.

35. The method of claim 32, wherein the authentication information further includes at least one of a PIN, a password, and biometric data.

36. A method of generating an identity authentication code associated with an authentication device, comprising:
providing event state data that specifies information about environmental conditions associated with the authentication device; and,
generating an identity authentication code that depends on (i) the event state data, and (ii) a secret associated with the device;
wherein the information includes temperature characteristics associated with the authentication device 37. The method of claim 36, wherein the identity code further depends on a dynamic value.

38. The method of claim 37, wherein the dynamic value includes one or more of a time value, a challenge, and a counter.

39. The method of claim 36 wherein the temperature characteristics include an ambient temperature to which the authentication device is exposed.

40. The method of claim 36 wherein the temperature characteristics include a temperature of a component of the authentication device.

41. A method of generating an identity authentication code associated with an authentication device. comprising:
providing event state data that specifies information about environmental conditions associated with the authentication device; and,
generating an identity authentication code that depends on (i) the event state data, and (ii) a secret associated with the device;
wherein the information includes radiation levels to which the authentication device has been exposed.

42. method of generating an identity authentication code associated with an authentication device. comprising:
providing event state data that specifies information about environmental conditions associated with the authentication device; and,
generating an identity authentication code that depends on (i) the event state data, and (ii) a secret associated with the device;
wherein the information indicates whether static discharge to the device has occurred.

43. The method of claim 36, wherein the identity authentication code further depends on one or more of a PIN, a password, data derived from a biometric observation, user data, verifier data, and a generation value.

44. The method of claim 36, further including, before generating the authentication code, receiving user input data, wherein the user input data is at least one of a PIN, a password, and biometric data.

45. The method of claim 44, further comprising, before generating the authentication code, verifying whether the user input data is correct, and providing the identity authentication code only if the user input data is verified to be correct.

46. The method of claim 36, further including transmitting the identity authentication code to a verifier.

47. The method of claim 46, further including receiving, by the verifier, authentication information comprising the identity authentication code; and,
determining, by the verifier, the correctness of the identity authentication code and the event state data.

48. The method of claim 46, wherein the verifier includes a representation of the secret associated with the device.

49. The method of claim 47, wherein the authentication information further includes a user identifier.

50. The method of claim 47, wherein the authentication information further includes at least one of a PIN, a password, and biometric data.

51. A method for verifying the correctness of an identity authentication code, comprising:
receiving authentication information including the identity authentication code generated by an authentication device that depends on (i) a secret associated with the device, and (ii) event state data that specifies an operating condition of the authentication device, the operating condition specifying information on the likelihood that the authentication device has or will develop an operational problem; and
verifying the correctness of the identity authentication code, and determining the condition of the authentication device in response to the received identity authentication code;
wherein the operating condition of the authentication device includes information about whether a battery supplying power to the authentication device has fallen below an expected power level.

52. The method of claim 51, further including taking an action in response to the event state.

53. The method of claim 51, further including determining whether an event occurred in response to the determined event state.

54. The method of claim 51 wherein the condition of the device is covertly encoded in the authentication code.

55. The method of claim 51, wherein the authentication information further includes a user identifier.

56. The method of claim 55, wherein the authentication information further includes at least one of a PIN, a password, and biometric data.

57. The method of claim 51, wherein the verifying the correctness of the identity authentication code further includes generating an expected identity authentication code that depends an expected event state data.

58. The method of claim 51, wherein the verifying the correctness of the identity authentication code further includes recovering the event state data from the identity authentication code.

59. The method of claim 57, wherein the event state data includes one or more event state bits, a subset of bits being employed in generating identity authentication codes for different time interval.

60. A method for verifying the correctness of an identity authentication code, comprising:

receiving authentication information including the identity authentication code generated by an authentication device that depends on (i) a secret associated with the device, and (ii) event state data that is a security indicator for an authentication system of which the authentication device is a component and verifying the correctness of the identity authentication code, and determining the event state data in response to the received identity authentication code;

wherein the security indicator includes information about whether the device has been subjected to tampering; and wherein the event state data was generated using a funk-spiel scheme.

61. A method for verifying the correctness of an identity authentication code, comprising:

receiving authentication information including an identity authentication code generated by an authentication device that depends on (i) a secret associated with the device, and (ii) event state data that specifies information about environmental conditions associated with the authentication device; and verifying the correctness of an identity authentication code, and determining the event state data in response to the received identity authentication codes;

wherein the information includes temperature characteristics associated with the authentication device.

62. The method of claim 20 wherein:

a first secret and a second secret are stored within the authentication device;

the event state data encodes a first state or a second state, the first state indicating that no tampering has occurred, and the second state indicating that tampering has occurred;

wherein, if the event state data encodes the first state:
the secret associated with the device is the first secret; and
generating an identity authentication code includes cryptographically combining the first secret with a dynamic value; and wherein, if the event state data encodes the second state:
the secret associated with the device is the second secret; and
generating an identity authentication code includes cryptographically combining the second secret with a dynamic value.

63. The method of claim 24, wherein the method further includes:

if the security indicator indicates that the PIN of a user using the authentication device has been entered incorrectly more than a specified number of times, then restricting access of the user by eliminating the user's access to highly confidential information, while permitting access to non-confidential information.

64. The method of claim 60 wherein the security indicator further includes information regarding a length of time the authentication device has been inserted into a device reader.

65. The method of claim 60 wherein the security indicator further includes information regarding a protection level of the secret associated with the device.

66. The method of claim 61 wherein the temperature characteristics include an ambient temperature to which the authentication device is exposed.

67. The method of claim 61 wherein the temperature characteristics include a temperature of a component of the authentication device.

68. The method of claim 61 wherein the information further includes radiation levels to which the authentication device has been exposed.

69. The method of claim 61 wherein the information indicates whether static discharge to the device has occurred.

* * * * *

UNITED STATES PATENT AND TRADEMARK OFFICE
CERTIFICATE OF CORRECTION

PATENT NO. : 7,502,933 B2  Page 1 of 1
APPLICATION NO. : 10/724034
DATED : March 10, 2009
INVENTOR(S) : Markus Jakobsson, Ari Juels and Burton S. Kaliski, Jr.

It is certified that error appears in the above-identified patent and that said Letters Patent is hereby corrected as shown below:

Claim 10, Column 33, Line 62, "The method of claim 2, ..." should read --The method of claim 1, ...--.

Claim 11, Column 33, Line 64, "The method of claim 2, ..." should read --The method of claim 1, ...--.

Claim 12, Column 34, Line 1, "The method of claim 2, ..." should read --The method of claim 1, ...--.

Claim 14, Column 34, Line 9, "The method of claim 2, ..." should read --The method of claim 1, ...--.

Claim 19, Column 34, Line 23, "The method of claim 2, ..." should read --The method of claim 1, ...--.

Claim 42, Column 35, Line 34, "method of generating an identity authentication code ..." should read --A method of generating an identity authentication code ...--.

Claim 60, Column 37, Line 8, "device is a component and" should read --device is a component; and--.

Signed and Sealed this

Twenty-first Day of April, 2009

JOHN DOLL
*Acting Director of the United States Patent and Trademark Office*